US010972924B2

(12) United States Patent
Tang et al.

(10) Patent No.: US 10,972,924 B2
(45) Date of Patent: Apr. 6, 2021

(54) BEAM-BASED MULTI-CONNECTION COMMUNICATION METHOD, TERMINAL DEVICE, AND NETWORK DEVICE

(71) Applicant: HUAWEI TECHNOLOGIES CO., LTD., Guangdong (CN)

(72) Inventors: Xun Tang, Beijing (CN); Li Chai, Beijing (CN); Jinhua Miao, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/400,693

(22) Filed: May 1, 2019

(65) Prior Publication Data

US 2019/0261202 A1 Aug. 22, 2019
US 2020/0154291 A9 May 14, 2020

Related U.S. Application Data

(63) Continuation of application No. PCT/CN2017/112934, filed on Nov. 24, 2017.

(30) Foreign Application Priority Data

Nov. 4, 2016 (CN) .......................... 201610977317.X

(51) Int. Cl.
*H04B 7/06* (2006.01)
*H04W 76/10* (2018.01)
(Continued)

(52) U.S. Cl.
CPC .......... *H04W 24/04* (2013.01); *H04B 7/0617* (2013.01); *H04B 7/0695* (2013.01);
(Continued)

(58) Field of Classification Search
USPC ........................................... 370/341; 342/354
See application file for complete search history.

(56) References Cited

U.S. PATENT DOCUMENTS

2002/0177465 A1* 11/2002 Robinett ............... H04W 88/06
455/552.1
2006/0050736 A1* 3/2006 Segel .................. H04B 7/18591
370/474
(Continued)

FOREIGN PATENT DOCUMENTS

CN 103875191 A 6/2014
CN 104782056 A 7/2015
(Continued)

OTHER PUBLICATIONS

International Search Report dated Mar. 1, 2018 in corresponding International Application No. PCT/CN2017/112934.
(Continued)

*Primary Examiner* — Asad M Nawaz
*Assistant Examiner* — Jason A Harley
(74) *Attorney, Agent, or Firm* — Leydig, Voit & Mayer, Ltd.

(57) ABSTRACT

The present invention relates to a beam-based multi-connection communication method, a terminal device, and a network device. The method may include the following: Based on a multi-beam connection established between a terminal and a base station, the terminal further selects a dedicated message beam from a common message range of the base station based on a measurement result of an uplink pilot, or the base station selects a dedicated message beam from a common message range of the base station based on a measurement result of a downlink pilot; and the terminal or the base station chooses to delete at least one established beam connection. By selecting and deleting a multi-beam connection between the terminal and the base station, a (Continued)

high-quality beam connection is maintained, and interruption of data transmission between the base station and terminal is avoided, thereby ensuring normal communication between the base station and the UE.

16 Claims, 16 Drawing Sheets

(51) Int. Cl.
  *H04W 16/28* (2009.01)
  *H04W 24/04* (2009.01)
  *H04W 24/08* (2009.01)
  *H04W 74/08* (2009.01)
  *H04B 7/08* (2006.01)

(52) U.S. Cl.
  CPC ............ *H04B 7/088* (2013.01); *H04W 24/08* (2013.01); *H04W 74/08* (2013.01); *H04W 76/10* (2018.02); *H04W 16/28* (2013.01)

(56) References Cited

U.S. PATENT DOCUMENTS

| | | | | |
|---|---|---|---|---|
| 2014/0073337 A1* | 3/2014 | Hong | ............... | H04W 16/28 455/452.1 |
| 2014/0153423 A1* | 6/2014 | Shin | ............... | H04W 36/18 370/252 |
| 2015/0236772 A1 | 8/2015 | Hammarwall et al. | | |
| 2016/0099763 A1 | 4/2016 | Chen | | |
| 2016/0183232 A1* | 6/2016 | Stirling-Gallacher | ............... | H04W 72/1226 370/280 |
| 2016/0192358 A1* | 6/2016 | Lee | ............... | H04W 74/006 370/329 |
| 2016/0352403 A1 | 12/2016 | Kishiyama et al. | | |
| 2017/0237477 A1* | 8/2017 | Fujio | ............... | H04W 16/28 370/329 |
| 2017/0331670 A1* | 11/2017 | Parkvall | ............... | H04W 52/0274 |

FOREIGN PATENT DOCUMENTS

| | | |
|---|---|---|
| CN | 105940699 A | 9/2016 |
| WO | 2016055003 A1 | 4/2016 |

OTHER PUBLICATIONS

"Beam Management Considerations for above 6 GHz NR," 3GPP TSG RAN WG1 Meeting #86, Gothenburg, Sweden, R1-167543, XP51125969, pp. 1-4, 3rd Generation Partnership Project, Valbonne, France (Aug. 22-26, 2016).

CN/201610977317, Office Action, dated Sep. 23, 2020.

"3rd Generation Partnership Project; Technical Specification Group Radio Access Network; Evolved Universal Terrestrial Radio Access (E-UTRA); Medium Access Control (MAC) protocol specification (Release 14)," 3GPP TS 36.321 V14.0.0, pp. 1-36, 3rd Generation Partnership Project—Valbonne, France (Sep. 2016).

* cited by examiner

BEAM-BASED MULTI-CONNECTION COMMUNICATION METHOD, TERMINAL DEVICE, AND NETWORK DEVICE

CROSS-REFERENCE TO RELATED APPLICATIONS

This application is a continuation of International Application No. PCT/CN2017/112934 filed on Nov. 24, 2017, which claims priority to Chinese Patent Application No. 201610977317.X, filed on Nov. 4, 2016, both of which are hereby incorporated by reference in its entireties.

TECHNICAL FIELD

The present invention relates to the high-frequency wireless communication field, and in particular, to a beam-based multi-connection communication method, a terminal device, and a network device.

BACKGROUND

In the high-frequency wireless communication field, a beam path loss increases as a frequency increases, and a cell coverage area is reduced. As a result, more access network devices (the access network devices may be base stations or transmission reception points (TRP)) need to be deployed in a same area, so that coverage can be ensured. Consequently, network deployment costs greatly increases. Therefore, a beam-based communication method needs to be provided.

In the prior art, a beamforming technology (that is, a multi-antenna processing technology) is used to form a narrow beam by using a plurality of antennas, to increase a beam gain and compensate for a path loss to some extent. As shown in FIG. 1, a region A is a low-frequency coverage area, a region B is a high-frequency coverage area, a region C is a narrow-beam coverage area, and L is a cell boundary covered by a base station. Because a beam gain of a narrow beam is relatively high, a path loss at a high frequency is compensated. To ensure continuous coverage in a cell, a plurality of narrow beams need to be used. For example, if a width of each narrow beam is 10°, 36 same narrow beams cover the entire cell. A terminal first completes initial beam alignment between the terminal and the base station (that is, an initial beam connection between the terminal and the base station) by using a random access process, that is, the terminal searches for a service beam between the terminal and the base station. The service beam is a beam having best signal quality in all beams that can be received by the terminal. As the terminal moves or rotates, and a channel changes, the terminal needs to perform beam tracking to establish a communication connection to a plurality of beams of the base station.

However, a high-frequency communication channel changes drastically, and channel quality is frequently reduced significantly. For example, a signal propagation path is usually a direct or reflective path, and is easily affected by an obstacle, affecting communication quality. When at least one of a plurality of beam connections is blocked, data transmission between the terminal and the base station is interrupted, and communication quality is reduced.

SUMMARY

This application provides a beam-based multi-connection communication method, a terminal device, and a network device, so that by selecting and deleting a multi-beam connection between a terminal device and a network device, a high-quality beam connection is maintained, interruption of data transmission between the network device and the terminal device is avoided, thereby ensuring normal communication between the network device and the terminal device.

According to a first aspect, a beam-based multi-connection communication method is provided, and the method may include: establishing, by a terminal device, a communication connection to a first sub-beam of a network device by using a first beam in a plurality of beams. The terminal device establishes a beam connection to a dedicated message beam (the first sub-beam) of the network device, to select a multi-beam connection between the terminal device and the network device, that is, implement dedicated communication between UE and a base station, so that a high-quality beam connection is maintained, and interruption of data transmission between the network device and the terminal device is avoided, thereby ensuring normal communication between the network device and the terminal device. In an optional implementation, before the establishing, by a terminal device, a communication connection to a first sub-beam of a network device by using a first beam, the method further includes: receiving, by the terminal device by using the first beam, downlink reference signals sent by a plurality of sub-beams of the network device, and measuring signal quality of the plurality of sub-beams of the network device based on the downlink reference signals. The downlink reference signal may be a downlink pilot signal, and the downlink pilot signal is usually used by the terminal device to estimate a downlink channel. The terminal device obtains measurement results. To obtain real-time measurement results, the measurement process may be periodic. The measurement results may be values of RSRP or RSRQ of all the downlink sub-beams, or attribute information of N (N≥1) optimal sub-beams, such as index information or port number information of the sub-beams. The UE selects, from the measurement results as the first sub-beam, an optimal sub-beam or a sub-beam with a relatively large value of reference signal received power (RSRP) or reference signal received quality (RSRQ), to determine a first beam pair, so as to select a beam of the base station. The first beam pair includes the first beam of the terminal device and the first sub-beam of the network device. The terminal device sends attribute information of the first sub-beam to the network device by using the first beam, so that the network device determines the first sub-beam based on the attribute information of the first sub-beam, and the network device establishes, by using the first sub-beam, a communication connection to the first beam used by the terminal device.

In an optional implementation, after the measuring, by the terminal device, signal quality of the plurality of sub-beams of the network device based on the downlink reference signals, the method further includes: sending, by the terminal device, attribute information of the plurality of sub-beams to the network device by using the first beam, so that the network device determines the first sub-beam based on the attribute information of the plurality of sub-beams. To be specific, the base station selects the first sub-beam based on the attribute information of the plurality of sub-beams, such as signal quality information and a beam scheduling condition, that is, information about a resource allocated to a beam of the UE, so that the network device establishes, by using the first sub-beam, a communication connection to the first beam used by the terminal device.

In an optional implementation, before the establishing, by a terminal device, a communication connection to a first sub-beam of a network device by using a first beam, the method further includes: sending, by the terminal device, an uplink reference signal to the network device by using the first beam. The uplink reference signal may be an uplink pilot signal and is used by the base station to estimate an uplink channel, so that the network device determines a first beam pair based on the uplink reference signal. The first beam pair includes the first beam of the terminal device and the first sub-beam of the network device, so that the terminal device establishes a beam connection to the first sub-beam by using the first beam.

In an optional implementation, the sending, by the terminal device, an uplink reference signal to the network device by using the first beam specifically includes: receiving, by the terminal device by using the first beam, a first message sent by the network device, where the first message may be an RRC message, such as an RRC configuration message, the first message includes uplink reference signal resource information and first indication information, and the first indication information is used to indicate an uplink reference signal resource used by one or more beams of the terminal device; and sending, by the terminal device, the uplink reference signal to the network device based on the uplink reference signal resource information and the first indication information by using the first beam.

According to a second aspect, a beam-based multi-connection communication method is provided, and the method may include: establishing, by a network device, a communication connection to a first beam of a terminal device by using a first sub-beam, where the first sub-beam is a sub-beam of a first beam in a plurality of beams of the network device. The terminal device establishes a beam connection to a dedicated message beam (the first sub-beam) of the network device, to select a multi-beam connection between the terminal device and the network device, that is, implement dedicated communication between UE and a base station, so that a high-quality beam connection is maintained, and interruption of data transmission between the network device and the terminal device is avoided, thereby ensuring normal communication between the network device and the terminal device.

In an optional implementation, before the establishing, by a network device, a communication connection to a first beam of a terminal device by using a first sub-beam, the method further includes: sending, by the network device, downlink reference signals to the terminal device by using a plurality of sub-beams, so that the terminal device measures signal quality of the plurality of sub-beams of the network device based on the downlink reference signals, and determines a first beam pair based on measurement results, where the first beam pair includes the first beam of the terminal device and the first sub-beam of the first beam of the network device; and receiving, by the network device by using the first beam, attribute information that is of the first sub-beam and that is sent by the terminal device, and determining the first sub-beam based on the attribute information of the first sub-beam; or receiving, by the network device by using the first beam, attribute information of the plurality of sub-beams that is sent by the terminal device, and determining, by the network device, the first sub-beam based on the attribute information of the plurality of sub-beams, so that the network establishes a communication connection to the first beam of the terminal device by using the first sub-beam.

In an optional implementation, before the establishing, by a network device, a communication connection to a first beam of a terminal device by using a first sub-beam, the method further includes: receiving, by the network device by using the first beam, an uplink reference signal sent by the terminal device; and determining, by the network device, a first beam pair based on the uplink reference signal, where the first beam pair includes the first beam of the terminal device and the first sub-beam of the network device, so that the network device establishes a communication connection to the first beam of the terminal device by using the first sub-beam.

In an optional implementation, the receiving, by the network device by using the first beam, an uplink reference signal sent by the terminal device specifically includes: sending, by the network device, a first message to the terminal device by using the first beam, where the first message includes uplink reference signal resource information and first indication information, and the first indication information is used to indicate an uplink reference signal resource used by one or more beams of the terminal device; and receiving, by the network device by using the first beam, the uplink reference signal sent by the terminal device based on the uplink reference signal resource information and the first indication information.

In an optional implementation, before the sending, by the network device, a first message to the terminal device by using the first beam, the method further includes: allocating, by the network device, at least one uplink reference signal resource to the terminal device that has a multi-beam connection.

According to a third aspect, a beam-based multi-connection communication method is provided, and the method may include: sending, by a terminal device, a first message to a network device; and receiving, by the terminal device, a second message sent by the network device, after the network device determines, based on the first message, a to-be-deleted first beam connection from a beam connection connected between the network device and the terminal device, where the second message may be an RRC message, a PDCCH order message, or a MAC CE message, and the second message includes information instructing to delete the first beam connection, to instruct to delete the first beam connection. Therefore, a multi-beam connection between the terminal device and the network device is deleted, that is, dedicated communication between UE and a base station is implemented, so that a high-quality beam connection is maintained, interruption of data transmission between the network device and the terminal device is avoided, thereby ensuring normal communication between the network device and the terminal device.

In an optional implementation, the first message is a measurement report, and the measurement report includes measurement results of signal quality of a plurality of beams of the network device; and the receiving, by the terminal device, a second message sent by the network device, after the network device determines, based on the first message, a to-be-deleted first beam connection from a beam connection connected between the network device and the terminal device, where the second message includes information instructing to delete the first beam connection, to instruct to delete the first beam connection specifically includes: when the network device determines, based on the measurement results, the to-be-deleted first beam connection from the beam connection connected between the network device and the terminal device, receiving, by the terminal device, the second message sent by the network device, where the second message includes the information instructing to delete the first beam connection; and deleting, by the terminal device, the first beam connection based on the information instructing to delete the first beam connection, so that the terminal device no longer listens to a downlink message sent by the network device by using the first beam connection, thereby reducing signaling overheads.

In an optional implementation, before the sending, by the terminal device, a first message to a network device, the method further includes: receiving, by the terminal device by using a plurality of beams, reference signals sent by the plurality of beams of the network device; measuring signal quality of the plurality of beams of the network device based on the reference signals; and sending, by the terminal device, the measurement report to the network device, where the measurement report includes measurement results of the signal quality of the plurality of beams of the network device.

In an optional implementation, the receiving, by the terminal device, a second message sent by the network device specifically includes: receiving, by the terminal device by using a first beam, the second message sent by the network device, where the first beam is a beam in a first beam pair in the first beam connection, and the first beam is a beam used by the terminal device; or receiving, by the terminal device by using a second beam other than a first beam of the terminal device, the second message sent by the network device. In the method, reliability of communication between the terminal device and the network device can be ensured.

In an optional implementation, the second message further includes index information of the to-be-deleted first beam connection; and when the terminal device receives, by using the second beam other than the first beam of the terminal device, the second message sent by the network device, the deleting, by the terminal device, the first beam connection based on the information instructing to delete the first beam connection specifically includes: deleting, by the terminal device, the first beam connection based on the information instructing to delete the first beam connection and the index information of the to-be-deleted first beam connection.

In an optional implementation, the first message is a delete request message, and the delete request message includes index information of the to-be-deleted first beam connection or index information of a first beam of the network device; and the receiving, by the terminal device, a second message sent by the network device, after the network device determines, based on the first message, a to-be-deleted first beam connection from a beam connection connected between the network device and the terminal device specifically includes: when the network device determines, based on the index information of the to-be-deleted first beam connection or the index information of the first beam of the network device, the to-be-deleted first beam connection from the beam connection connected between the network device and the terminal device, receiving, by the terminal device, the second message sent by the network device.

According to a fourth aspect, a beam-based multi-connection communication method is provided, where a network device communicates with and connects to a terminal device by using a plurality of beams, and the method includes: receiving, by the network device by using the plurality of beams, a first message sent by the terminal device; determining, based on the first message, a to-be-deleted first beam connection from a beam connection connected between the network device and the terminal device; and sending, by the network device, a second message to the terminal device, where the second message includes information instructing to delete the first beam connection, to instruct to delete the first beam connection.

In an optional implementation, the first message is a measurement report, and the measurement report includes measurement results of signal quality of the plurality of beams of the network device; and the determining, by the network device based on the first message, a to-be-deleted first beam connection from a beam connection connected between the network device and the terminal device specifically includes: determining, by the network device based on the measurement results, the to-be-deleted first beam connection from the beam connection connected between the network device and the terminal device.

In an optional implementation, before the receiving, by the network device by using the plurality of beams, a first message sent by the terminal device, the method further includes: sending, by the network device, reference signals to the terminal device by using the plurality of beams, so that the terminal device measures the signal quality of the plurality of beams of the network device based on the reference signals; and receiving, by the network device by using the plurality of beams, the measurement report sent by the terminal device, where the measurement report includes the measurement results of the signal quality of the plurality of beams of the network device.

In an optional implementation, the second message further includes index information of the to-be-deleted first beam connection, so that the terminal device deletes the first beam connection based on the information instructing to delete the first beam connection and the index information of the to-be-deleted first beam connection, and the terminal device no longer listens to a downlink message sent by the network device by using the first beam connection.

In an optional implementation, the first message is a delete request message, and the delete request message includes index information of the to-be-deleted first beam connection or index information of a first beam of the network device; and the determining, by the network device based on the first message, a to-be-deleted first beam connection from a beam connection connected between the network device and the terminal device specifically includes: determining, by the network device based on the index information of the to-be-deleted first beam connection or the index information of the first beam of the network device, the to-be-deleted first beam connection from the beam connection connected between the network device and the terminal device.

According to a fifth aspect, a beam-based multi-connection communication method is provided, where a terminal device communicates with and connects to a network device by using a plurality of beams, and the method includes: determining, by the terminal device, a first beam pair; sending, by the terminal device, a first message to the network device, where the first message includes identification information of the terminal device and beam connection establishment request information; when the network device determines, based on the identification information of the terminal device, that a quantity of beam connections between the network device and the terminal device reaches a connection threshold, receiving, by the terminal device, a first response message sent by the network device based on the beam connection establishment request information, where the first response message includes beam connection replacement indication information; and replacing, by the terminal device based on the beam connection replacement indication information, a second beam connection with a first beam connection formed by using the first beam pair, so that the terminal device no longer listens to a downlink message sent by the network device by using the second beam connection, and instead, listens, by using the first beam connection, to the downlink message sent by the network device, where the second beam connection is a beam connection established between the terminal device and the network device.

In an optional implementation, the determining, by the terminal device, a first beam pair specifically includes: receiving, by the terminal device by using each beam, a reference signal sent by the network device by using each of a plurality of beams; measuring, by the terminal device, signal quality of the plurality of beams of the network device based on the reference signals; and determining, by the terminal device, the first beam pair based on measurement results, where signal quality of the first beam connection formed by using the first beam pair is higher than that of the second beam connection.

In an optional implementation, the sending, by the terminal device, a first message to the network device specifically includes: sending, by the terminal device, the first message to the network device by using a first beam, where the first beam is a beam in the first beam pair, and the first beam is a beam used by the terminal device.

In an optional implementation, the first response message further includes index information of the to-be-replaced second beam connection; and the replacing, by the terminal device based on the beam connection replacement indication information, a second beam connection with a first beam connection formed by using the first beam pair specifically includes: replacing, by the terminal device based on the beam connection replacement indication information and the index information of the second beam connection, the second beam connection with the first beam connection formed by using the first beam pair.

In an optional implementation, before the sending, by the terminal device, a first message to the network device, the method further includes: sending, by the terminal device, a random access preamble message to the network device by using a first beam; and receiving, by the terminal device by using the first beam, a random access response message sent by the network device based on the random access preamble message.

According to a sixth aspect, a beam-based multi-connection communication method is provided, where a network device communicates with and connects to a terminal device by using a plurality of beams, and the method includes: receiving, by the network device, a first message sent by the terminal device after the terminal device determines a first beam pair, where the first message includes identification information of the terminal device and beam connection establishment request information; and after the network device determines, based on the identification information of the terminal device, that a quantity of beam connections between the network device and the terminal device reaches a connection threshold, sending, by the network device, a first response message based on the beam connection establishment request information, where the first response message includes beam connection replacement indication information, so that the terminal device replaces, based on the beam connection replacement indication information, a second beam connection with a first beam connection formed by using the first beam pair, and the terminal device no longer listens to a downlink message sent by the network device by using the second beam connection, and instead, listens, by using the first beam connection, to the downlink message sent by the sending unit, where the second beam connection is a beam connection established between the terminal device and the network device.

In an optional implementation, before the receiving, by the network device, a first message sent by the terminal device after the terminal device determines a first beam pair, the method further includes: sending, by the network device, a reference signal to the terminal device by using each of the plurality of beams, so that the terminal device determines the first beam pair based on the reference signal, where signal quality of the first beam connection formed by using the first beam pair is higher than that of the second beam connection.

In an optional implementation, the first response message further includes index information of the to-be-replaced second beam connection, so that the terminal device replaces, based on the beam replacement indication information and the index information of the second beam connection, the second beam connection with the first beam connection formed by using the first beam pair.

In an optional implementation, before the receiving, by the network device, a first message sent by the terminal device, the method further includes: receiving, by the network device by using a first beam, a random access preamble message sent by the terminal device; and sending, by the network device, a random access response message to the terminal device based on the random access preamble message by using the first beam.

According to a seventh aspect, a terminal device is provided, and the terminal device has functions of implementing behavior of the terminal device in the method designs in the first aspect, the third aspect, and the fifth aspect. The functions may be implemented by hardware, or may be implemented by hardware by executing corresponding software. The hardware or software includes one or more modules corresponding to the foregoing functions. The terminal device may further include a storage unit, configured to store instruction information and data information communicated between the terminal device and the network device.

According to an eighth aspect, a network device is provided, and the network device has functions of implementing behavior of the network device in the method designs in the second aspect, the fourth aspect, and the sixth aspect. The functions may be implemented by hardware, or may be implemented by hardware by executing corresponding software. The hardware or software includes one or more modules corresponding to the foregoing functions. The network device may further include a storage unit, configured to store instruction information and data information communicated between the terminal device and the network device.

According to a ninth aspect, a terminal device is provided, and the terminal device may include a receiver, a transmitter, and a processor. The receiver, the transmitter, and the processor are configured to perform various types of communication between the terminal device and the network device in the first aspect to the sixth aspect. The terminal device may further include a memory, and the memory is configured to store a program instruction and data that are necessary for the terminal device.

According to a tenth aspect, a computer storage medium is provided. The computer storage medium is configured to store a computer software instruction used by the foregoing network device, and the computer software instruction includes a program designed for performing the foregoing aspects.

According to an eleventh aspect, a network device is provided, and the network device may include a transceiver and a processor. The transceiver and the processor are configured to perform various types of communication between the terminal device and the network device in the first aspect to the sixth aspect. The network device may further include a memory, and the memory is configured to store a program instruction and data that are necessary for the network device.

According to another aspect, a computer storage medium is provided. The computer storage medium is configured to store a computer software instruction used by the foregoing terminal device, and the computer software instruction includes a program designed for performing the foregoing aspects.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may derive other drawings from these accompanying drawings without creative efforts.

DESCRIPTION OF EMBODIMENTS

The technical solutions of the present invention are further described in detail with reference to accompanying drawings and embodiments.

A beam-based communication method provided in the present invention is applied to a cellular communications network in a high-frequency wireless communication scenario. The technology described in the present invention may be applied to a Long Term Evolution (LTE) system or another wireless communications system that uses various radio access technologies, for example, a system that uses an access technology such as Code Division Multiple Access, Frequency Division Multiple Access, Time Division Multiple Access, orthogonal frequency division multiple access, or single carrier frequency division multiple access. In addition, the technology may be applied to a subsequent evolved system of the LTE system, for example, a fifth generation 5G system or a new radio (NR) system.

In the present invention, nouns "network" and "system" are usually interchangeably used, but meanings of the nouns may be understood by a person skilled in the art. A terminal device in the present invention may include various handheld devices, in-vehicle devices, wearable devices (WD), and computing devices that have a wireless communication function, or other processing devices connected to a wireless modem, and user equipment (UE), a mobile station (MS), a terminal, and the like in various forms. A base station (BS) in the present invention is a network device that is deployed in a radio access network and that is configured to provide a wireless communication function for a terminal. The base station may include a macro base station, a micro base station, a relay station, an access point, and the like in various forms. In systems using different radio access technologies, names of a device that has a base station function may be different. For example, in an LTE network, the device is referred to as an evolved NodeB (eNB or eNodeB); and in a fifth generation 5G network or an NR network, the device is referred to as a new radio NodeB (NR-NB). For ease of description, the foregoing terminal devices in the present invention may be collectively referred to as UE, and the foregoing network devices that provide a wireless communication function for the UE may be collectively referred to as a base station.

Main network elements used in the embodiments of the present invention are described below in detail.

An eNB is configured to expand a coverage area in a downlink direction by forming a narrow beam, and may also receive signals from different directions in an uplink direction by using different beams. The eNB may support sending and receiving of data by using two or more beams at any moment.

A TRP is configured to expand a coverage area in a downlink direction by forming a narrow beam, and may also receive signals from different directions in an uplink direction by using different beams.

Figure 1:
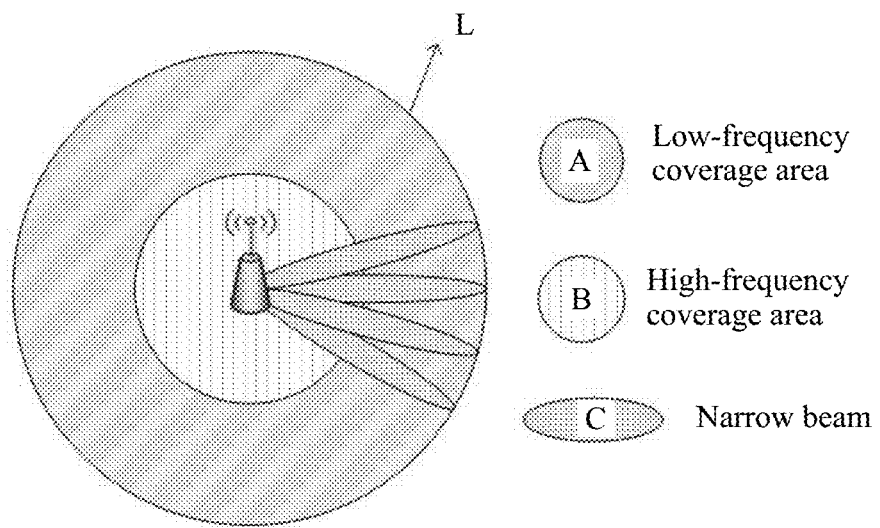
FIG. 1 is a schematic diagram of coverage areas of a base station on different frequency bands.
Figure 2:
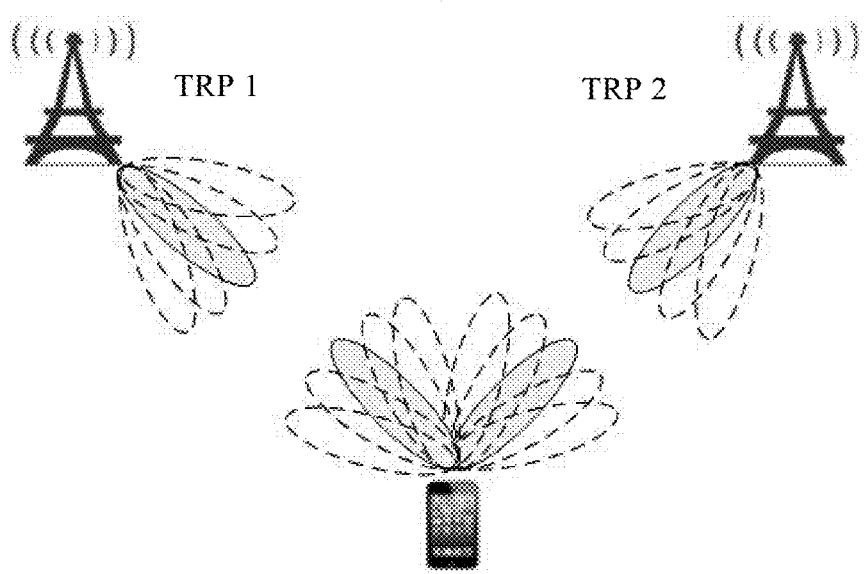
FIG. 2 is a schematic diagram of a multi-connection of a terminal according to an embodiment of the present invention.

UE is configured to determine an available beam by searching for reference information (for example, a pilot signal) sent by the eNB/TRP, and feed back a selection result to the eNB/TRP. In addition, if a plurality of antennas are deployed on the UE side, a plurality of transmit and receive beams may be formed on the UE side by using a beamforming technology. As shown in FIG. 2, the UE may communicate with a plurality of TRPs (for example, a TRP 1 and a TRP 2) by using a plurality of beams, or may communicate with one TRP (for example, a TRP 1 or a TRP 2) by using a plurality of beams. The UE may support sending and receiving of data by using two or more beams at any moment.

Figure 3A:
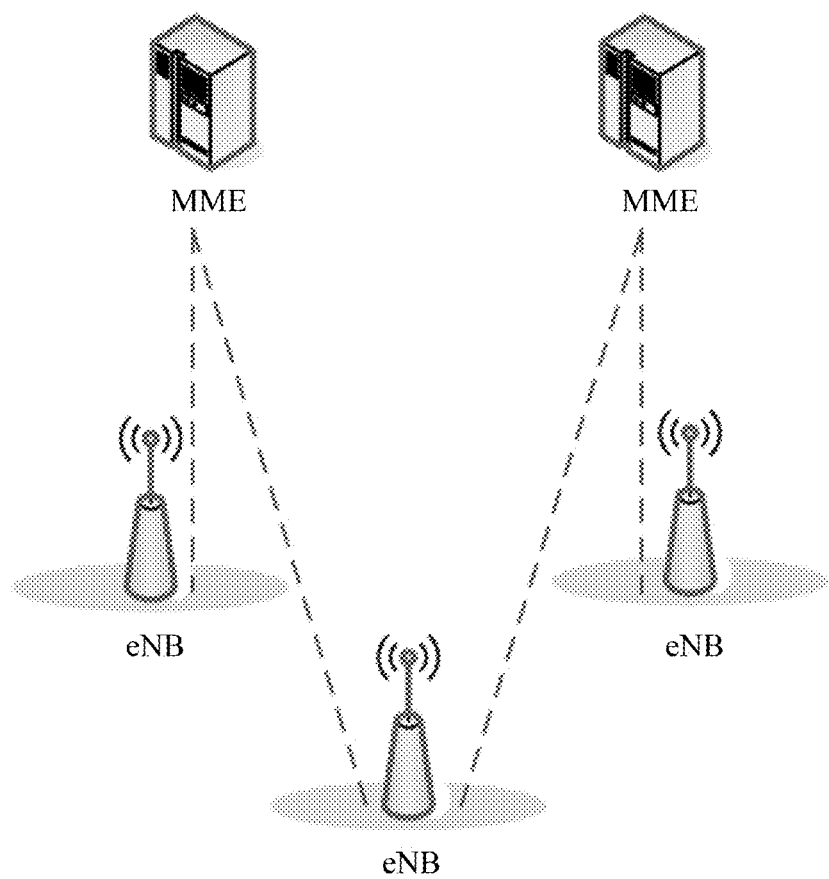
FIG. 3A is a schematic diagram of a topology structure of an LTE communications system in the prior art.

In an LTE communications system shown in FIG. 3A, there is at least one eNB under control of one mobility management entity (MME). Each eNB has a plurality of cells, and the eNB may use a plurality of transmit beams to complete cell coverage in each cell, so as to communicate with UE.

Figure 3B:
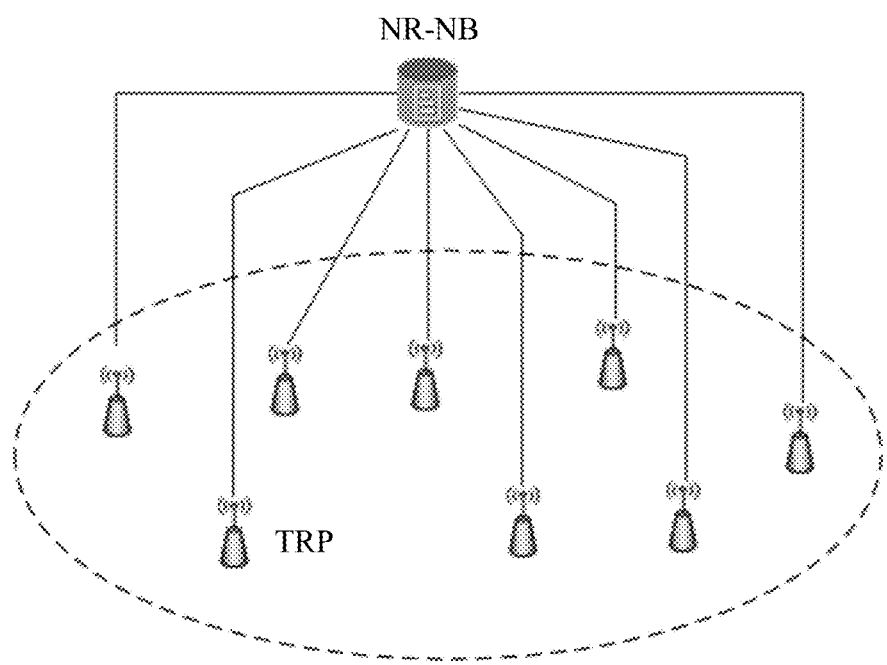
FIG. 3B is a schematic diagram of a topology structure of a 5G communications system in the prior art.

In a 5G system or an NR system shown in FIG. 3B, there may one or more TRPs under control of one NR-NB. Each TRP may generate a plurality of beams, and the TRP may use a plurality of transmit beams to complete cell coverage in each cell, so as to communicate with UE.

Figure 4:
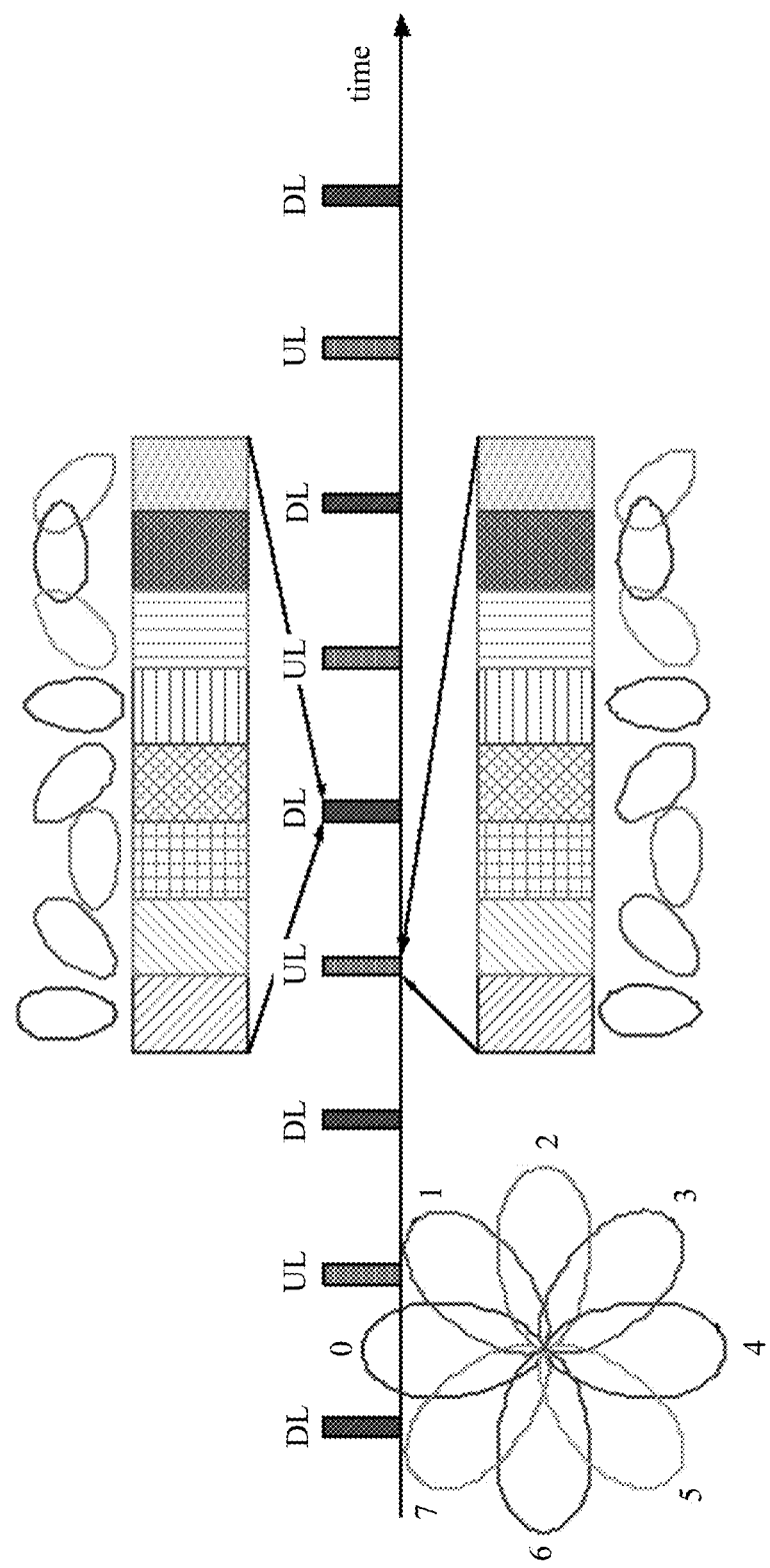
FIG. 4 is a schematic diagram of a process of scanning an uplink beam and a downlink beam on a base station side in the prior art.

Further, because an area covered by each beam is limited, a beam scanning process needs to be performed to complete cell coverage. When a base station completes cell coverage by using a plurality of narrow beams, the base station may send or receive data in a time division/frequency division/wavelength division manner or a combination manner thereof. As shown in FIG. 4, the base station may complete coverage of an entire cell in a time division multiplexing manner. The base station has eight beams, and the eight beams are respectively identified by digital symbols 0 to 7. A horizontal axis is a time axis, and there is at least one uplink receive subframe (UL) and at least one downlink receive subframe (DL) on the time axis. The beams represented by the digital symbols are successively sent to UE in a time sequence, and a time period A to a time period H that are occupied by the beams represented by the digital symbols are the same. When receiving uplink data, the base station receives the uplink data in a separate uplink receive subframe, and receives, on each symbol, data in only a corresponding beam direction. When sending downlink data, the base station sends the downlink data in a separate downlink transmit subframe, and sends, on each symbol, data in only a corresponding beam direction.

The base station may generate beams of two widths based on attribute information of the base station. One is a common message beam used to receive a common message (for example, a random access preamble message or an uplink scheduling request), and the other is a dedicated message beam used to perform dedicated communication with the UE, for example, data communication. One common message beam may be subdivided into at least two dedicated message beams, or may not be subdivided into dedicated message beams (in this case, a capability of the base station may be not good enough). In other words, the dedicated message beam may be a common message beam, or may be a sub-beam of a common message beam. It may be understood that a width of the common message beam is greater than a width of the dedicated message beam.

Further, the base station needs to perform the beam scanning process to complete coverage of the entire cell. Therefore, to shorten a scanning time, a beam used by the base station during scanning is a common beam, that is, a relatively wide beam.

Figure 5:
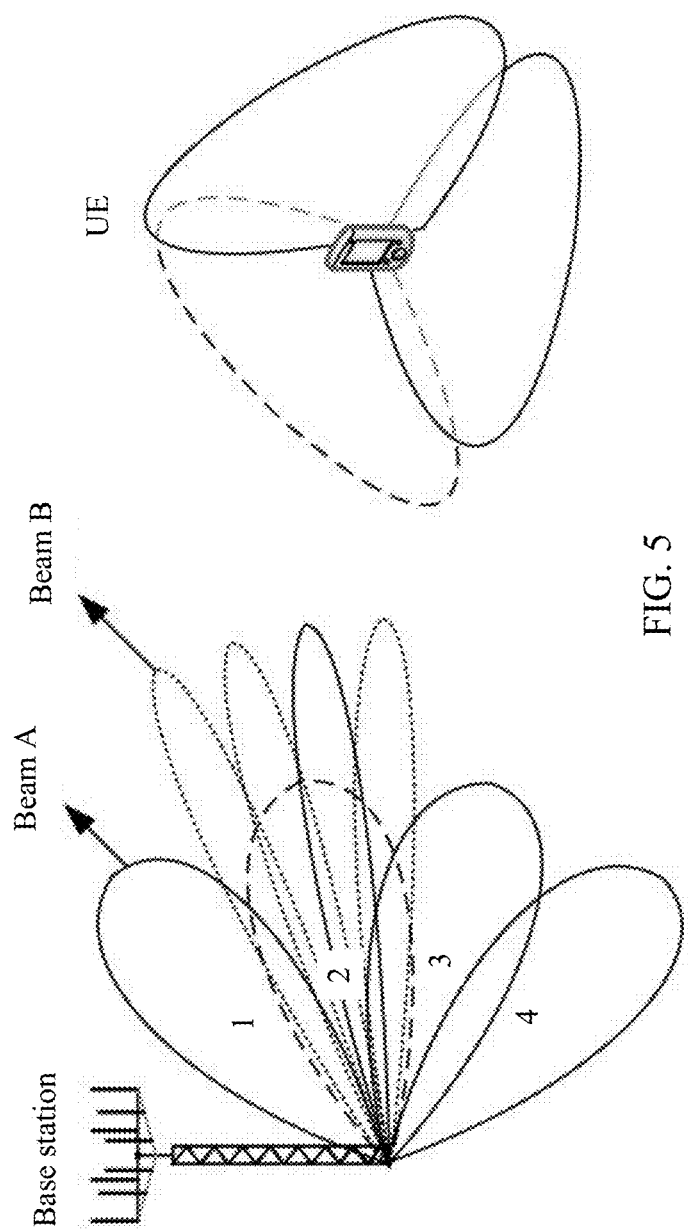
FIG. 5 is a schematic diagram of beam structures of a base station and a terminal.

FIG. 5 is a schematic diagram of beam structures of a base station and a terminal. As shown in FIG. 5, the terminal can generate three beams, and the beams have a same width. The base station may form four wide beams, namely, beams A. Each beam A may be subdivided into four narrow beams, namely, beams B. The beam A is used to receive a common message (for example, a random access preamble message). The beam B is a sub-beam (a dedicated message beam) of the beam A, and each beam A has four sub-beams. A width of the beam A is greater than a width of the beam B. The beam B is used to perform data communication with the UE. A relatively wide beam usually may be generated by using an analog beamforming technology, and a narrower beam can be formed based on analog beamforming by using a digital beamforming technology. This is equivalent to generating a sub-beam.

It may be understood that whether a transmit beam sent by the base station has a sub-beam is mainly determined by attribute information of the base station, that is, whether a sub-beam exists or whether a beam narrower than a sub-beam can be formed is an embodiment of a capability of the base station. If a sub-beam exists in a beam 2, of the base station, connected to the UE, the UE or the base station needs to select the sub-beam in the beam 2, so that the UE further establishes a beam connection to the sub-beam in the beam 2, and then exchanges information with the sub-beam. Alternatively, if no sub-beam exists in a beam 2, of the base station, connected to the UE, the UE directly exchanges information with the beam 2.

In this embodiment of the present invention, the terminal UE and the base station establish a communication connection to each other by using a plurality of beams, and the plurality of beams used by the base station are a plurality of common message beams.

Figure 6:
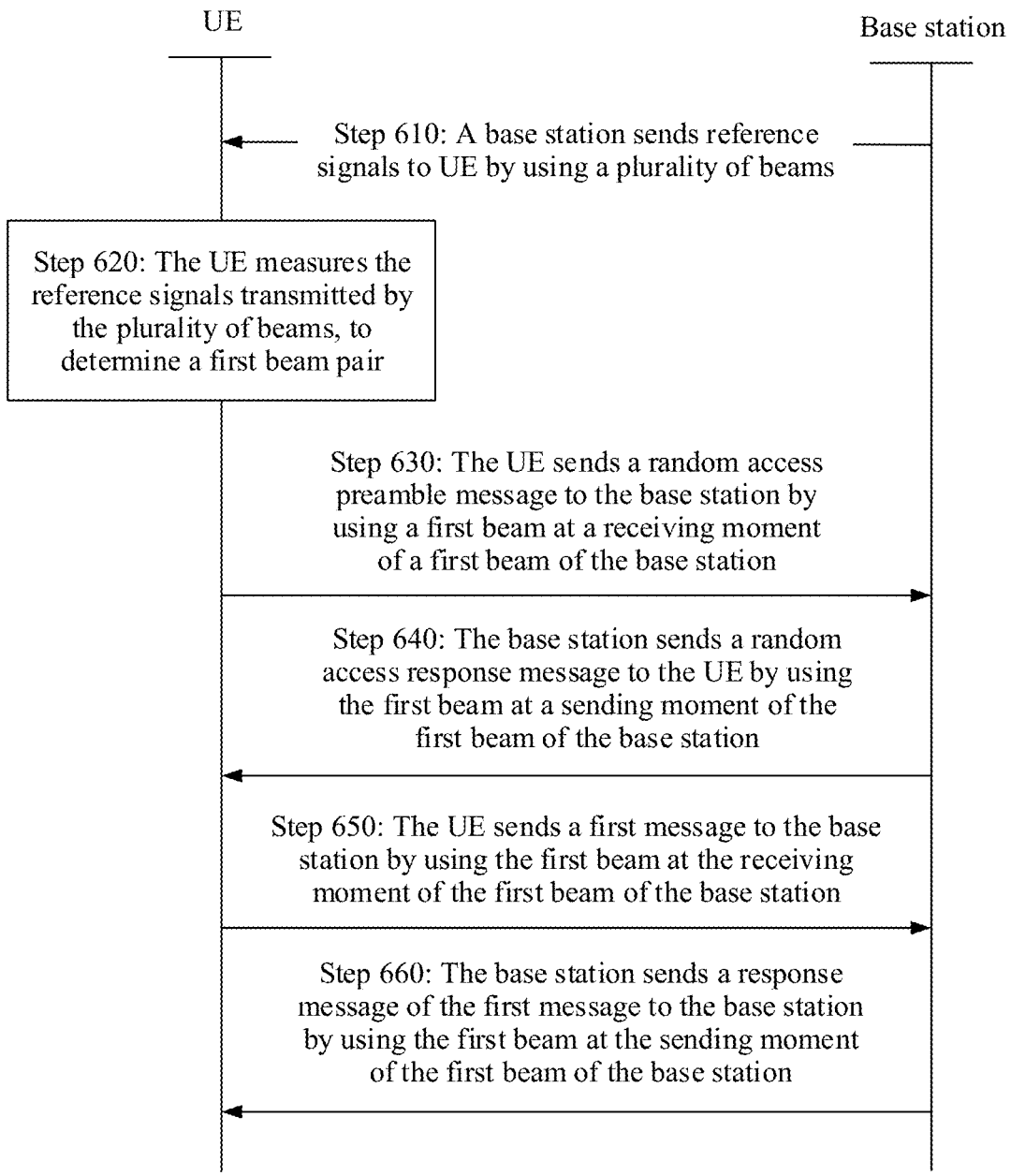
FIG. 6 shows a random access process of a terminal and a base station.

Optionally, the terminal UE and the base station may establish a communication connection to each other by using a random access process. As shown in FIG. 6, the process may include the following steps.

Step 610: The base station sends reference signals to the UE by using a plurality of beams.

The reference signal may be a synchronization signal, and the synchronization signal is used by the UE to obtain downlink synchronization. The UE can correctly obtain an indication message of the base station only after obtaining downlink synchronization, for example, the indication message is an uplink resource allocated to the UE for transmitting data or control signaling.

The base station sends synchronization signals to the UE by using the plurality of transmit beams, that is, one transmit beam transmits one synchronization signal. The synchronization signals transmitted by the transmit beams may be the same or different. In addition to the synchronization signal, each beam may have a separate reference signal specially used for channel estimation.

Step 620: The UE measures the reference signals transmitted by the plurality of beams of the base station, to determine a first beam pair, where the first beam pair includes a first transmit beam of the UE and a first receive beam of the base station.

The UE uses a plurality of local receive beams to measure signal quality of the reference signals that are delivered by the base station and that are transmitted in the plurality of transmit beams, to select a first transmit beam with best signal quality as a transmit beam, and select a first receive beam with best signal quality as a receive beam from the plurality of receive beams of the UE. In this way, the UE determines the first beam pair, and the first beam pair includes the first transmit beam of the UE and the first receive beam of the base station. A reference signal received by using the beam pair has best signal quality, that is, the first beam pair is an optimal beam pair. Signal quality may be measured by a value of reference signal received power (RSRP) or reference signal received quality (RSRQ) of each beam.

Optionally, an optimal transmit beam of the UE and an optimal receive beam of the base station form an optimal uplink beam pair, and an optimal receive beam of the UE and an optimal transmit beam of the base station form an optimal downlink beam pair. The optimal uplink beam pair and the optimal downlink beam pair may be a same beam pair, or may be different beam pairs.

When channel reciprocity is met, the optimal uplink beam pair and the optimal downlink beam pair are a same beam pair. When channel reciprocity is not met, the optimal uplink beam pair and the optimal downlink beam pair are different beam pairs, that is, an optimal downlink beam pair and an optimal uplink beam pair in a beam connection are not a same beam pair. A processing of determining the optimal uplink beam pair may also be implemented in a random access process, and details are not described in the present invention. Channel reciprocity can be applied by default to subsequent description of the present invention. A scenario to which channel reciprocity cannot be applied has no substantial impact on the present invention, and details are not described.

Step 630: The UE sends a random access preamble message to the base station by using a first uplink beam at a receiving moment of a first beam of the base station.

Before the UE performs step 630, after completing downlink synchronization and receiving a system message sent by the base station to obtain a cell random access resource configuration, the UE randomly selects a preamble on any random access time-frequency resource.

Afterwards, the UE sends the random access preamble message to the base station by using a first beam of the UE at the receiving moment of the first beam of the base station.

Step 640: The base station sends a random access response message to the UE by using the first beam at a sending moment of the first beam of the base station.

Before performing step 640, the base station calculates a corresponding timing advance (TA) value based on a received random access preamble.

The base station sends the random access response message to the UE by using the first beam at the sending moment of the first beam of the base station. The random access response message may include the TA value and an uplink scheduling grant (UL-Grant). The TA value is used to implement UL synchronization, and the UL-grant is used to instruct the UE to send UL data.

Step 650: The UE sends a first message to the base station by using a first beam at the receiving moment of the first beam of the base station, where the first message may include identification information of the UE.

The first message may be an RRC connection establishment request message, and the identification information of the UE may be a cell radio network temporary identifier (C-RNTI).

The UE sends an RRC connection establishment request message to the base station at the receiving moment of the first beam of the base station based on a resource indication in the received UL-grant and the received TA value. The message may include the identification information of the UE, so that the base station identifies the UE.

It should be noted that the first message may include different content in different downlink channel scenarios, for example, information such as a beam connection establishment request, an RRC connection establishment request, or a reestablishment request.

Step 660: The base station sends a response message of the first message to the UE by using the first beam at the sending moment of the first beam of the base station, to establish a communication connection.

The response message of the first message may be an RRC connection establishment acknowledgement message. After the UE receives the RRC connection establishment acknowledgement message, establishment of an RRC connection between the UE and the base station is completed.

It should be noted that the response message of the first message may include different content in different uplink channel scenarios, or may include different information based on different content of the first message.

Optionally, after the terminal UE establishes a communications connection (RRC connection) to the base station by using the first beam, the UE may send a maximum connection threshold of the UE to the base station, that is, a maximum quantity of beam connections that can be supported by the UE. The maximum connection threshold of the UE may be used as a reference value for determining, by the base station, whether the UE can further establish a beam connection, or may be used as a reference value for determining, by the base station, whether the UE can replace a beam connection.

It should be noted that in this embodiment of the present invention, in an information exchange process after the UE determines a beam pair, both the UE and the base station choose to send instruction information at a receiving moment of a beam of each other.

Further, based on a multi-beam connection established between UE and a base station, the UE may establish a beam-based communication connection to a first sub-beam of the base station in the following two manners. The first sub-beam is a sub-beam of a first common message beam in a beam connection established in the base station.

Figure 7A:
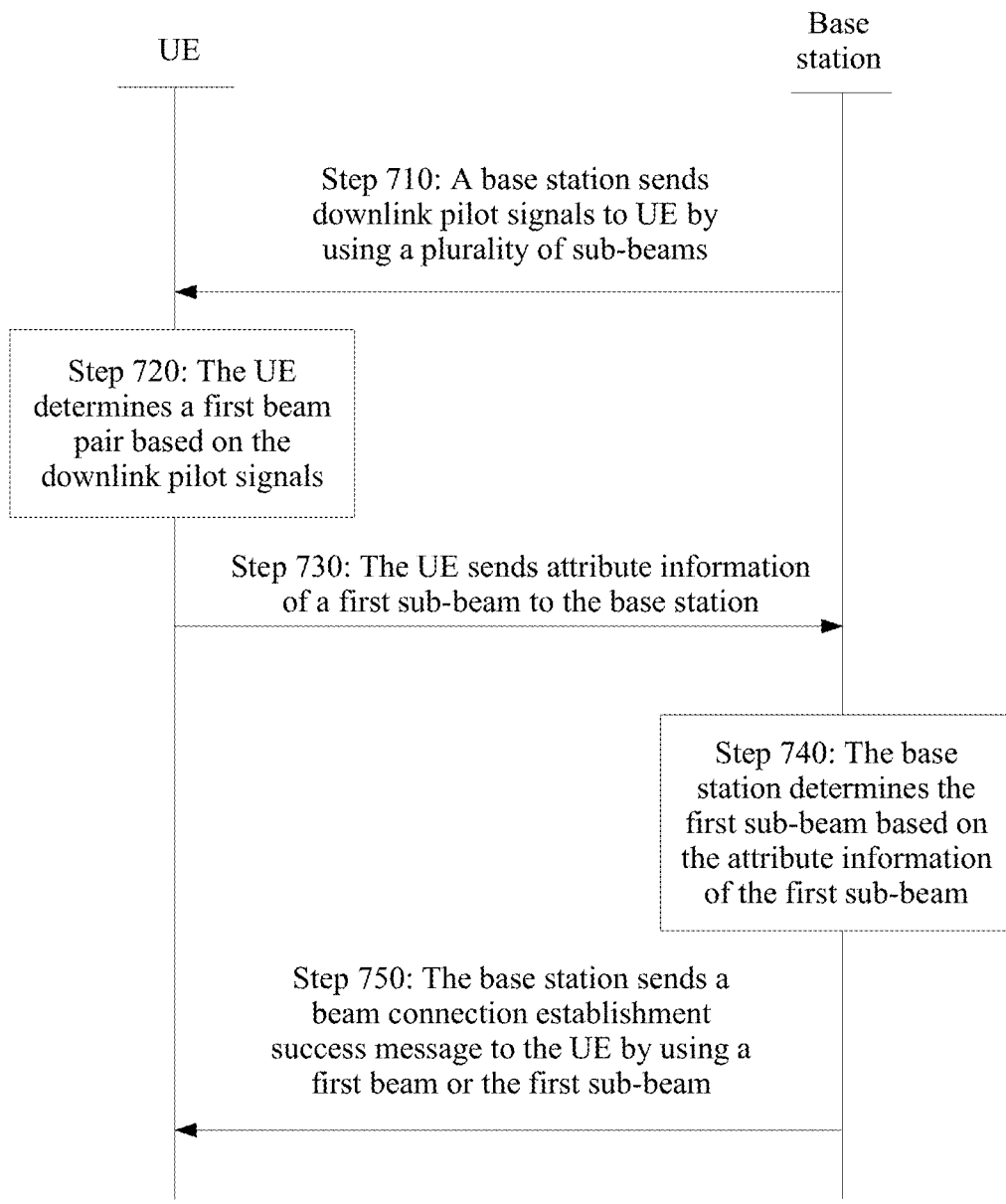
FIG. 7A is a diagram of signaling interaction in a beam-based multi-connection communication method according to an embodiment of the present invention.

FIG. 7A is a diagram of signaling interaction in a beam-based multi-connection communication method according to an embodiment of the present invention. As shown in FIG. 7A, the method may include the following steps.

Step 710: A base station sends downlink reference signals to UE by using a plurality of sub-beams.

After a multi-beam connection is established between the UE and the base station, the base station may send the downlink reference signals to the UE by using the plurality of sub-beams. The downlink reference signal may be a downlink pilot signal, and the downlink pilot signal is usually used by the UE to estimate a downlink channel, evaluate downlink channel quality, or demodulate downlink data.

Optionally, before step 710 is performed, because each reference signal resource may be corresponding to different sub-beams on the base station side, the base station may correspondingly deliver one downlink reference signal by using one sub-beam.

Step 711: The base station may configure a downlink reference signal resource for each beam connection established between the base station and the UE, and send indication information to the UE, where the indication information is used to indicate a downlink reference signal resource correspondingly used by one or more beams of the UE.

For example, the downlink reference signal is a downlink pilot signal. To ensure normal communication between the UE and the base station, the base station needs to continuously allocate the downlink pilot resource to the UE. The downlink pilot resource may be periodically allocated, or may be aperiodically allocated. This is not limited in this embodiment of the present invention.

In a radio resource configuration framework of a current serving cell, the base station may allocate a plurality of independent downlink pilot resources to the UE. Each beam connection uses a different pilot resource, that is, one independent downlink pilot resource is scheduled for a downlink beam in one beam connection.

Alternatively, the base station may allocate one downlink pilot resource to the UE, so that the UE determines, based on indication information, that the downlink pilot resource is scheduled for downlink beams in a plurality of beam connections in a time division multiplexing manner. To be specific, the base station configures time division multiplexing indication information, to instruct the downlink beams in the plurality of beam connections to circularly and successively use the downlink pilot resource in a time sequence; or the base station may configure a time division multiplexing correspondence, to instruct the downlink beams in the plurality of beam connections to use the downlink pilot resource.

Alternatively, the base station may allocate one downlink pilot resource to the UE, so that the UE determines, based on indication information, that the pilot resource is scheduled for all downlink beams in a plurality of beam connections in a spatial multiplexing manner. To be specific, the base station configures spatial multiplexing indication information, to instruct to schedule the pilot resource for all the downlink beams in the plurality of beam connections in a spatial multiplexing manner. This manner is applicable to only a case in which no interference exists between beams or interference is extremely small.

Step 720: The UE measures signal quality of the plurality of sub-beams of the base station based on the downlink reference signals, to determine a first beam pair, where the first beam pair includes a first beam of the terminal UE and a first sub-beam of the base station.

Optionally, the UE measures the signal quality of the plurality of sub-beams of the base station based on the downlink pilot signals, and selects the first sub-beam from the plurality of sub-beams based on measurement results, to determine the first beam pair.

The measurement results may be values of RSRP or RSRQ of all the downlink sub-beams, or attribute information of N (N≥1) optimal sub-beams, such as index information or port number information of the sub-beams. The UE selects, from the measurement results, an optimal sub-beam or a sub-beam with a relatively large value of RSRP or RSRQ as the first sub-beam.

It may be understood that in addition to the foregoing manner, the terminal UE may determine the first beam pair in another manner. This is not limited in this embodiment of the present invention.

Step 730: The UE sends attribute information of the first sub-beam to the base station.

The attribute information of the first sub-beam may be information such as an index number or a port number of the first sub-beam.

Step 740: The base station determines the first sub-beam based on the attribute information of the first sub-beam.

Step 750: The base station sends a beam connection establishment success message to the UE by using the first sub-beam or a first beam, to select a beam of the base station.

Optionally, if the base station has data information to be sent to the UE, the beam establishment success message may include the to-be-sent data information, so that the UE exchanges information with the base station.

Figure 7B:
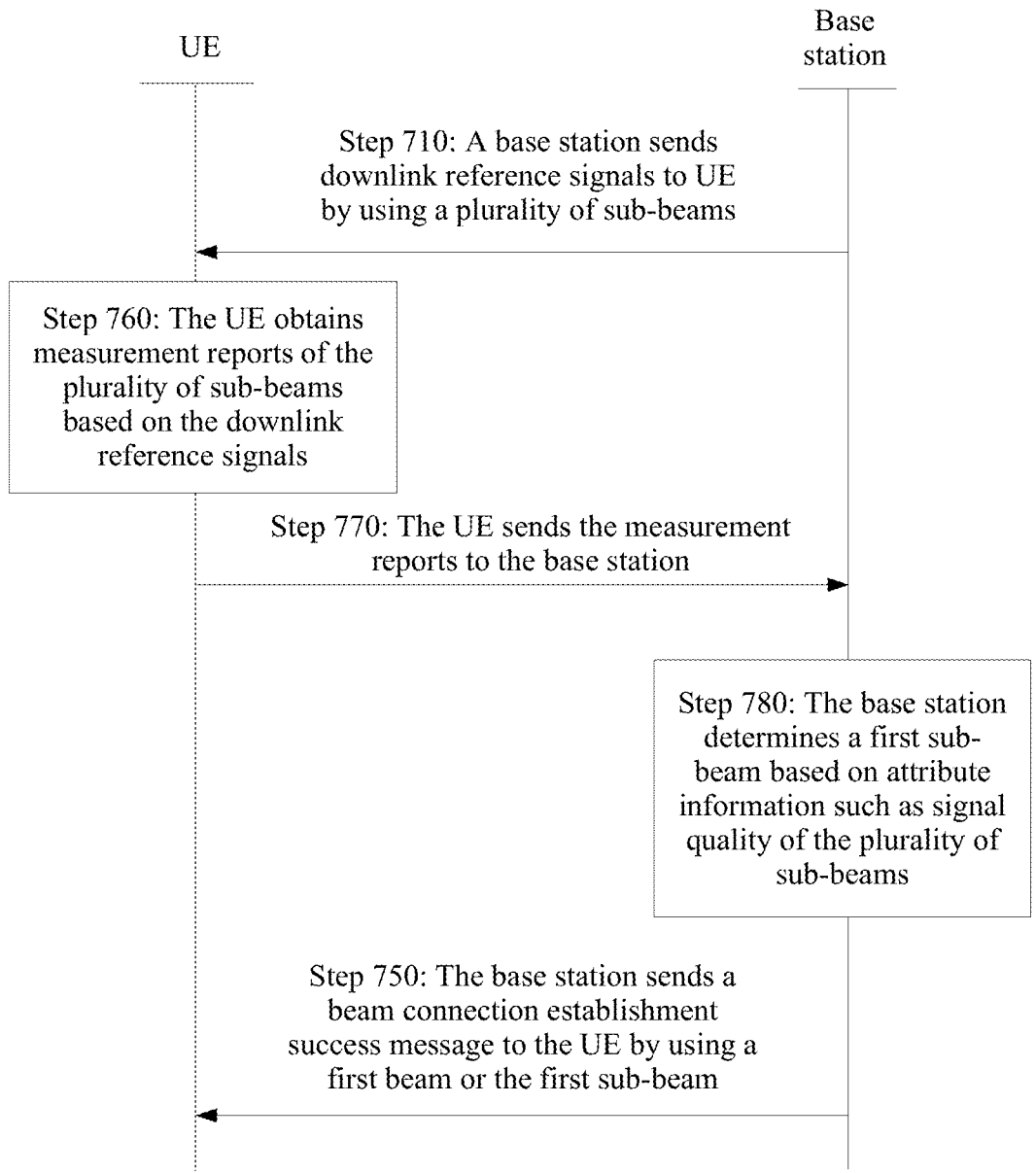
FIG. 7B is a diagram of signaling interaction in a beam-based multi-connection communication method according to an embodiment of the present invention.

FIG. 7B is a diagram of signaling interaction in a beam-based multi-connection communication method according to an embodiment of the present invention. As shown in FIG. 7B, the method may include the following steps.

Step 710: A base station sends downlink reference signals to UE by using a plurality of sub-beams.

Step 711: The base station may configure a downlink reference signal resource for each beam connection established between the base station and the UE, and send indication information to the UE, where the indication information is used to indicate a downlink reference signal resource correspondingly used by one or more beams of the UE.

It should be noted that step 710 and step 711 are the same as content in FIG. 7A, and details are not described herein again.

Step 760: The UE measures signal quality of the plurality of sub-beams of the base station based on the downlink reference signals, to obtain measurement reports of the plurality of sub-beams.

The measurement report may include values of RSRP or RSRQ of all the downlink sub-beams, or attribute information of N (N≥1) optimal sub-beams, such as index information of the sub-beams.

Step 770: The UE sends the measurement reports to the base station, where the measurement reports may include attribute information such as the signal quality of the plurality of sub-beams.

Step 780: The base station determines a first sub-beam based on the attribute information of the plurality of sub-beams.

The base station not only needs to select the first sub-beam based on the attribute information such as signal quality information of the plurality of sub-beams, but also needs to consider a beam scheduling condition, that is, information about a resource allocated to a beam of the UE.

It may be understood that in addition to the foregoing manner, the base station may determine the first sub-beam in another manner. This is not limited in this embodiment of the present invention.

Step 750: The base station sends a beam connection establishment success message to the UE by using the first sub-beam or a first beam, to select a beam of the base station.

Optionally, if the base station has data information to be sent to the UE, the beam establishment success message may include the to-be-sent data information, so that the UE exchanges information with the base station.

Figure 8:
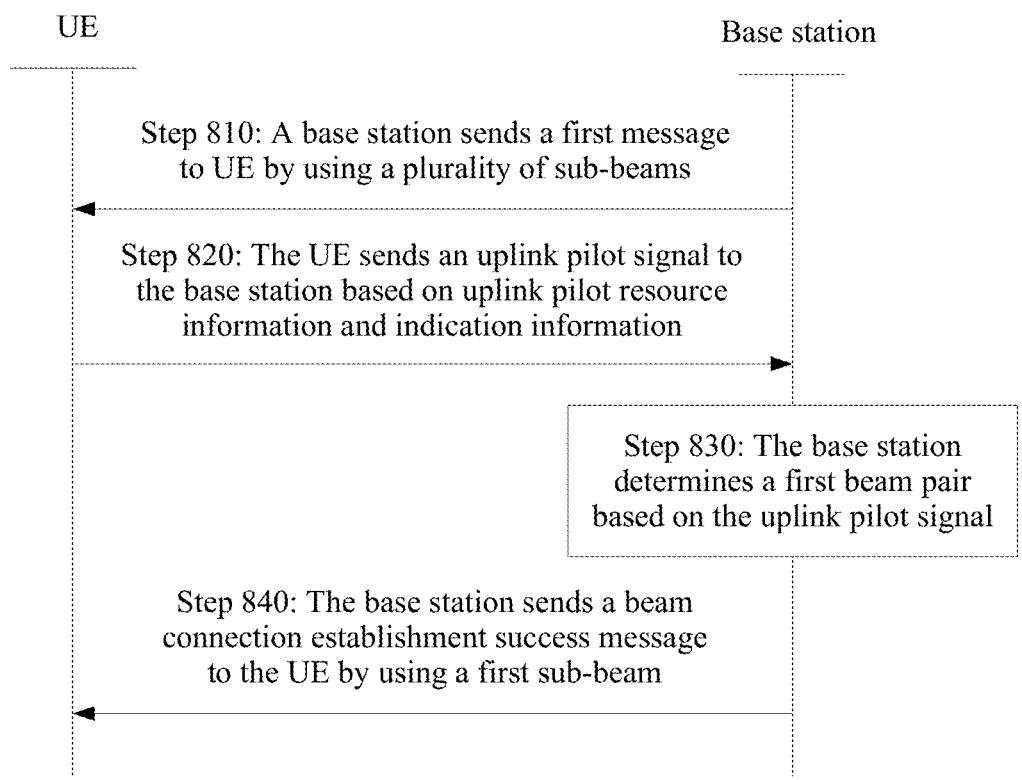
FIG. 8 is a diagram of signaling interaction in another beam-based multi-connection communication method according to an embodiment of the present invention.

FIG. 8 is a diagram of signaling interaction in another beam-based multi-connection communication method according to an embodiment of the present invention. As shown in FIG. 8, the method may include the following steps.

Step 810: A base station sends a first message to UE by using a first beam, where the first message may include uplink reference signal resource information and indication information, and the indication information is used to indicate an uplink reference signal resource used by one or more beams of the UE.

The uplink reference signal may be an uplink pilot signal, and the uplink pilot signal is usually used by the base station to estimate an uplink channel, evaluate uplink channel quality, or demodulate uplink data. That is, the base station configures an uplink reference signal resource for each beam connection.

Optionally, the first message may be an RRC message, for example, an RRC configuration message.

For example, the uplink reference signal is an uplink pilot signal. The indication information may be corresponding to beam connection index information, that is, the indication information explicitly indicates an uplink pilot resource used by each beam connection. Alternatively, the indication information may indicate, by using a configuration sequence of an uplink pilot resource (an occurrence sequence in a configuration message), an uplink pilot resource used by each beam connection. The configuration sequence of the uplink pilot resource is set to be corresponding to an index number of a current beam connection, that is, an uplink pilot resource 1 is corresponding to a beam connection 1, and so on, so as to indicate the uplink pilot resource used by each beam connection. It may be understood that a beam connection established between the UE and the base station needs to meet channel reciprocity.

To ensure normal communication between the UE and the base station, uplink pilot resource needs to be continuously allocated to the UE for use. The uplink pilot resource may be periodically allocated, or may be aperiodically allocated. This is not limited in this embodiment of the present invention.

Therefore, after a multi-beam connection is established between the UE and the base station, before performing step 810, the base station needs to configure an uplink pilot resource for the UE, for example, a channel sounding reference signal (SRS) pilot resource.

Optionally, if the uplink pilot resource is periodic configured, the base station may obtain indication information by configuring sounding reference signal uplink configuration dedicated information (for example, sounding reference signal uplink config dedicated information element, Sounding RS-UL-ConfigDedicated IE) in an RRC message. If the uplink pilot resource is aperiodic configured, the base station may obtain indication information by configuring SoundingRS-UL-ConfigDedicatedAperiodic-r10 IE information in an RRC message.

In a radio resource configuration framework of a current serving cell, the base station may allocate a plurality of independent uplink pilot resources to the UE. Each beam connection uses a different pilot resource, that is, one independent uplink pilot resource is scheduled for an uplink beam in one beam connection.

Alternatively, the base station may allocate one uplink pilot resource to the UE, so that the UE determines, based on indication information, that the uplink pilot resource is scheduled for uplink beams in a plurality of beam connections in a time division multiplexing manner. To be specific, the base station configures time division multiplexing indication information in an RRC message, to instruct the uplink beams in the plurality of beam connections to circularly and successively use the uplink pilot resource in a time sequence; or the base station may configure a time division multiplexing correspondence, to instruct the uplink beams in the plurality of beam connections to use the uplink pilot resource.

Alternatively, the base station may allocate one uplink pilot resource to the UE, so that the UE determines, based on indication information, that the pilot resource is scheduled for all uplink beams in a plurality of beam connections in a spatial multiplexing manner. To be specific, the base station configures spatial multiplexing indication information in an RRC message, to instruct to schedule the pilot resource for all the uplink beams in the plurality of beam connections in a spatial multiplexing manner. This manner is applicable to only a case in which no interference exists between beams or interference is extremely small.

Returning to step 810, after the uplink reference signal resource is configured by the base station, the uplink reference signal resource is sent to the UE by using a beam, of the base station, in a beam connection.

Step 820: The UE sends an uplink reference signal to the base station based on the uplink reference signal resource information and the indication information by using a first beam.

The UE sends the uplink reference signal to the base station based on the uplink reference signal resource information by using the first beam in a first beam connection.

Step 830: The base station determines a first beam pair based on the uplink reference signal, where the first beam pair includes the first beam of the UE and a first sub-beam of the first beam of the base station.

For example, the uplink reference signal is an uplink pilot signal. After performing channel estimation on the first beam of the UE based on the uplink pilot signal, the base station calculates transmission weights corresponding to the plurality of sub-beams. The transmission weight is a direction adjustment amount. The base station adjusts a transmission direction of the sub-beam based on the transmission weight, to determine the first sub-beam (optimal beam) that matches the first beam of the UE and determine the first beam pair, and sends downlink data to the UE by using the first sub-beam, to replace the first beam connection established between the UE and the base station. The first beam pair includes the first beam of the UE and the first sub-beam of the base station, and the first beam connection includes the first beam of the UE and the first beam of the base station.

Optionally, the base station may determine the first beam pair according to a connection criterion that signal quality is greater than a preset threshold.

It may be understood that in addition to the foregoing manner in step 810 to step 830, the base station may determine the first beam pair in another manner. This is not limited in this embodiment of the present invention.

Step 840: The base station sends a beam connection establishment success message to the UE by using the first sub-beam, to select a beam of the base station.

Optionally, if the base station has data information to be sent to the UE, the beam establishment success message may include the to-be-sent data information, so that the UE exchanges information with the base station.

In this embodiment of the present invention, after establishing a connection to a plurality of common message beams by using a random access process, the UE may further select a dedicated message beam from a range of each of the plurality of common message beam by using a measurement result of an uplink reference signal or a measurement result of a downlink reference signal. The UE further establishes a beam connection to the dedicated message beam based on different pilot resources (a plurality of pilot resources) that are corresponding to different beam connections and that are allocated by the base station to each UE, or one pilot resource (which is used through time division multiplexing or spatial multiplexing) corresponding to different beam connections, so as to implement dedicated communication between the UE and the base station.

Further, as the UE moves or rotates or with another channel change, the base station chooses to delete at least one beam connection, to prevent communication between the UE and the base station from being blocked. The to-be-deleted at least one beam connection may be a beam connection with relatively poor signal quality. Alternatively, under consideration such as power consumption reduction, the UE or the base station chooses to delete at least one beam connection. It may be understood that the to-be-deleted beam connection may be a beam connection between the UE and a sub-beam (dedicated message beam) of the base station, or may be a beam connection between the UE and a common message beam of the base station.

It should be noted that deleting a beam connection means that the UE no longer listens to a downlink message sent by the base station in the beam connection.

A method for deleting a beam connection is described below in detail in the present invention.

Figure 9:
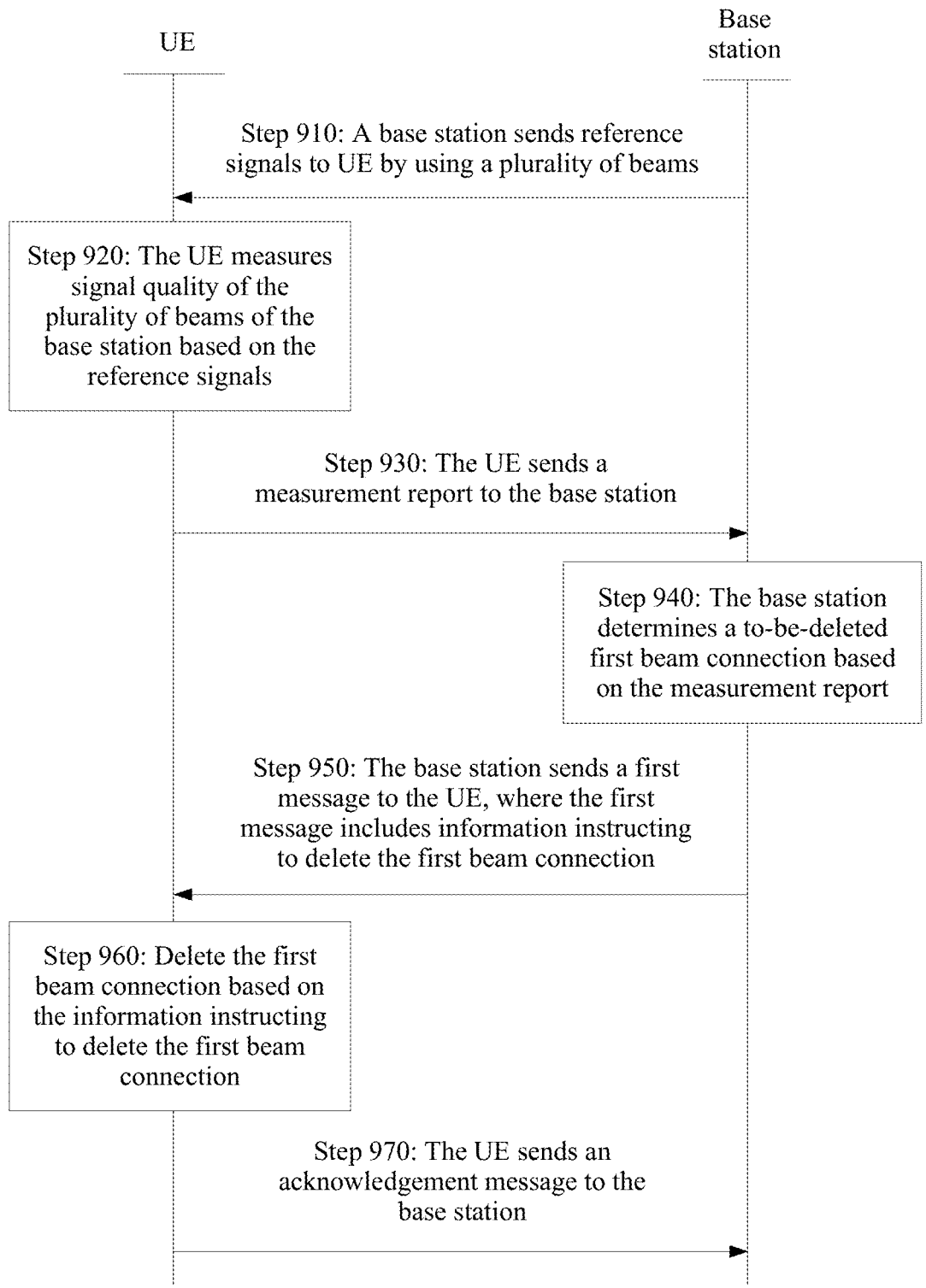
FIG. 9 is a diagram of signaling interaction in still another beam-based multi-connection communication method according to an embodiment of the present invention.

FIG. 9 is a diagram of signaling interaction in still another beam-based multi-connection communication method according to an embodiment of the present invention. As shown in FIG. 9, the method may include the following steps.

Step 910: A base station sends reference signals to UE by using a plurality of transmit beams.

The reference signal may be a synchronization signal or another downlink pilot signal. The synchronization signal is used by the UE to obtain downlink synchronization. The UE can correctly obtain an indication message of the base station only after obtaining downlink synchronization, for example, the indication message is an uplink resource allocated to the UE for transmitting data or control signaling. The downlink pilot signal is usually used by the UE to estimate a downlink channel, evaluate downlink channel quality, or demodulate downlink data.

For example, the reference signal is a synchronization signal. The base station sends synchronization signals to the UE by using the plurality of transmit beams, that is, one transmit beam transmits one synchronization signal. The synchronization signals transmitted by the transmit beams may be the same or different. In addition to the synchronization signal, each beam may have a separate reference signal specially used for channel estimation.

Step 920: The UE measures signal quality of the plurality of beams of the base station based on the reference signals, and obtains measurement results.

The UE receives the reference signal sent by each of the plurality of beams of the base station, and performs channel estimation on the plurality of beams of the base station, to obtain attribute information of the plurality of beams, such as signal quality information.

The terminal UE measures the signal quality of the plurality of beams of the base station based on the attribute information, and obtains the measurement results.

It should be noted that the process in which the UE measures the plurality of beams of the base station may be periodic, or may be triggered by the base station. Preferably, considering accuracy and real-time quality of measurement, in this embodiment of the present invention, the UE periodically measures the plurality of beams of the base station.

Step 930: The UE sends a measurement report to the base station, where the measurement report may include signal quality information of the plurality of beams of the base station.

Step 940: The base station determines, based on the measurement report, a to-be-deleted first beam connection from a beam connection connected between the base station and the UE.

The base station determines, based on the measurement results, the to-be-deleted first beam connection from the beam connection connected between the base station and the UE. It may be understood that the to-be-deleted first beam connection may have signal quality lower than a preset threshold, and may also cause excessively high power consumption of the UE.

Step 950: The base station sends a first message to the UE, where the first message includes information instructing to delete the first beam connection, to instruct the UE to delete the first beam connection.

The first message may be an RRC message, a PDCCH order message, or a MAC CE message.

Optionally, the information that instructs to delete the first beam connection and that is in the first message may be obtained in the following manners:

(1) When the first message is a PDCCH order message, the base station may add one or more bits to the PDCCH order message, and configure the added bits as different values that represent different meanings, for example, "all zeros" represents addition of a beam connection, "all ones" represents deletion of a beam connection; or configure another specific combination form. Alternatively, in an existing PDCCH structure, the base station configures different bit combinations to represent deletion of a beam connection. For example, in downlink control information (DCI) format 1, the base station set all bits to 0, or set another element to 0 or another specific value, for example, the another element is a process number of a hybrid automatic repeat quest (HARQ), and/or a cyclic shift of a demodulation reference signal DMRS (Demodulation Reference Signal).

(2) When the first message is a MAC CE message, the base station may set a dedicated LCID. For a specific configuration process, refer to a configuration process, shown in FIG. 7, of an LCID in a MAC CE subheader structure. Details are not described herein again.

(3) When the first message is an RRC message, the base station may configure a dedicated information element (IE) in the RRC message.

Optionally, the first message may further include index information of the to-be-deleted first beam connection. When the first beam connection cannot be used to transmit the first message, that is, the signal quality of the beam connection is lower than the preset threshold, the base station may send the firstmessage by using a beam connection (a second beam connection) other than the first beam connection, and add the index information of the first beam connection to the first message.

Step 960: The UE deletes the first beam connection based on the information instructing to delete the first beam connection.

Step 970: The UE sends an acknowledgement (ACK) message to the base station, and completes a deletion operation.

In the foregoing embodiment of the present invention, according to an actual design requirement, for example, signal quality is lower than a preset threshold, or power consumption of a beam connection is relatively high, or to reduce signaling overheads, or only to periodically report the measurement result, the UE may send the measurement report to the base station. When the base station determines, based on the measurement report, the to-be-deleted first beam connection from the beam connection connected between the base station and the UE, the UE receives the first message sent by the base station, and the UE deletes the first beam connection based on the first message. After deleting the first beam connection, the UE no longer listens to a downlink message sent by the base station, thereby improving quality of communication between the base station and the UE.

Figure 10:
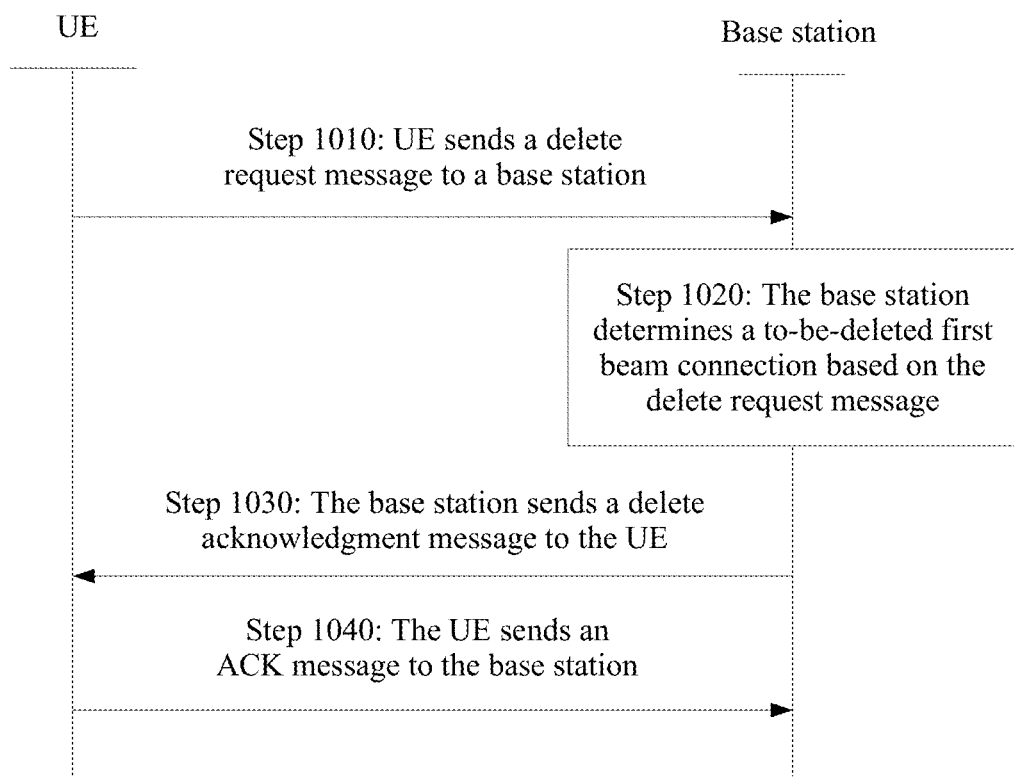
FIG. 10 is a diagram of signaling interaction in still another beam-based multi-connection communication method according to an embodiment of the present invention.

FIG. 10 is a diagram of signaling interaction in still another beam-based multi-connection communication method according to an embodiment of the present invention. As shown in FIG. 10, the method may include the following steps.

Step 1010: UE sends a delete request message to a base station, where the delete request message includes index information of a to-be-deleted first beam connection or index information of a first beam of the base station side.

When the UE detects that signal quality of the first beam connection is poor or power consumption of the first beam connection is relatively large, the UE sends the delete request message to the base station, to instruct to delete the first beam connection.

If the first beam connection can be used to transmit the message in this case, that is, the signal quality of the first beam connection is higher than a preset threshold, the UE sends the delete request message to the base station by using the first beam connection, to instruct to delete the current beam connection.

If the first beam connection cannot be used to transmit the message in this case, that is, the signal quality of the first beam connection is lower than the preset threshold, the UE may send the delete request message by using a beam connection (a second beam connection) other than the first beam connection, and add the index information of the first beam connection to the delete request message.

Step 1020: The base station determines, based on the delete request message, the to-be-deleted first beam connection from a beam connection connected between the base station and the UE.

The base station determines, based on the index information of the to-be-deleted first beam connection or the index information of the first beam of the base station side, the to-be-deleted first beam connection from the beam connection connected between the base station and the UE.

Step 1030: After the base station determines the to-be-deleted first beam connection, the base station sends a delete acknowledgement message to the UE, where the delete acknowledgement message includes information instructing to delete the first beam connection, to instruct the UE to delete the first beam connection.

Step 1040: The UE sends an ACK message to the base station, and completes a deletion operation.

In the foregoing embodiment of the present invention, according to an actual design requirement, for example, signal quality is lower than a preset threshold, or power consumption of a beam connection is relatively high, or to reduce signaling overheads, the UE may send the delete request message to the base station. When the base station determines, based on the delete request message, the to-be-deleted first beam connection from the beam connection connected between the base station and the UE, the UE receives the delete acknowledgement message sent by the base station, and the UE deletes the first beam connection based on the delete acknowledgement message. In this way, quality of communication between the base station and the UE is improved.

In a process in which the UE and the base station communicate with each other through a multi-beam connection, when a quantity of beam connections of the UE reaches a maximum beam connection threshold, the UE or the base station performs a replacement operation, that is, deletes an established beam connection and adds a new beam connection. In this case, a random access process is initiated for the new beam pair. The replacement operation may be understood as follows: The UE no longer listens, by using the second beam connection established to the base station, a downlink message sent by the base station, and instead, listens, by using the first beam connection, to the downlink message sent by the base station.

Figure 11:
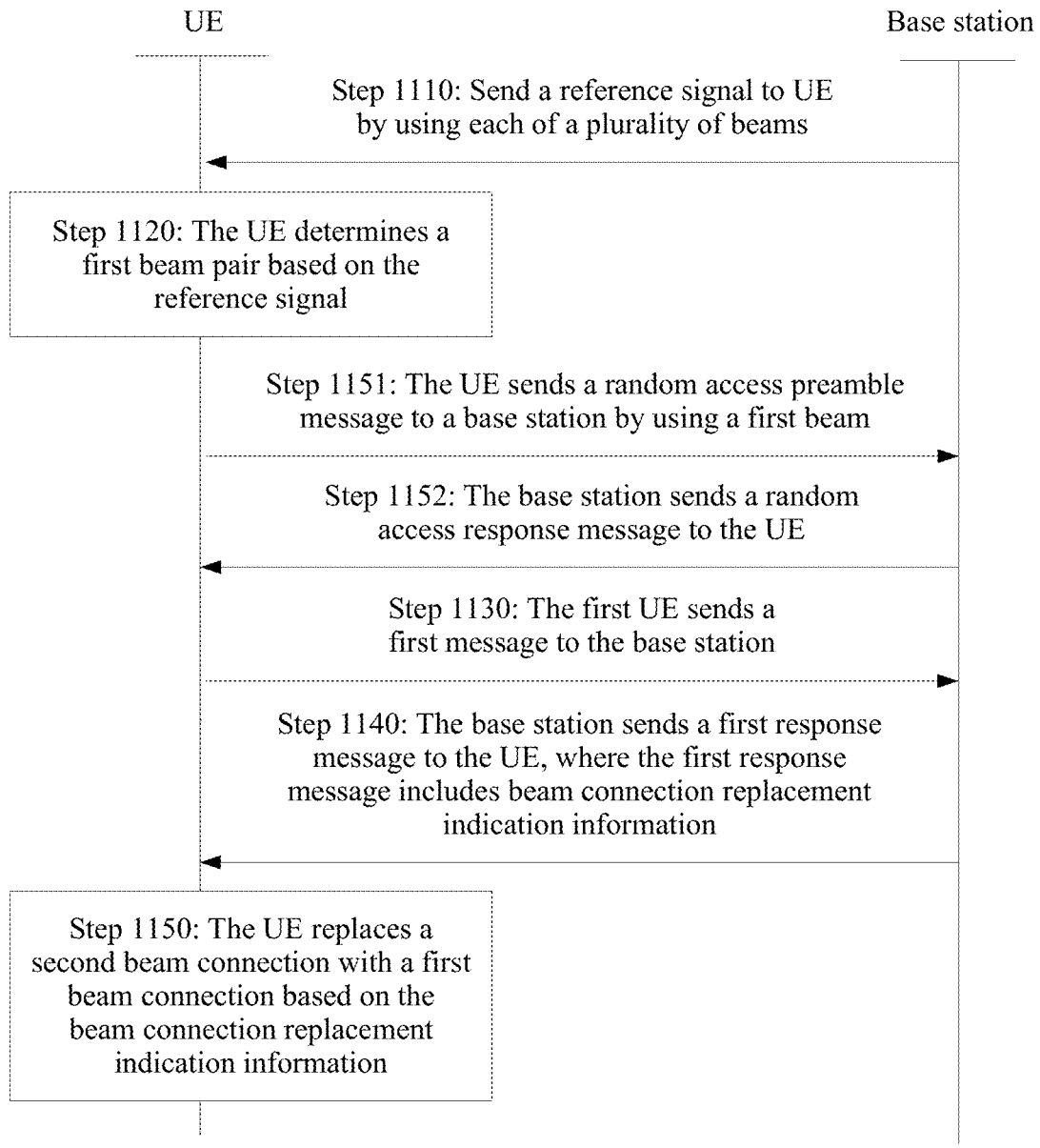
FIG. 11 is a diagram of signaling interaction in beam connection replacement according to an embodiment of the present invention.

FIG. 11 is a diagram of signaling interaction in beam connection replacement according to an embodiment of the present invention. As shown in FIG. 11, the method may include the following steps.

Step 1110: A base station sends a reference signal to UE by using each of a plurality of beams.

The reference signal may be a synchronization signal or a pilot signal.

Step 1120: The UE measures signal quality of the plurality of beams of the base station based on the reference signals, and determines a first beam pair based on measurement results.

Due to movement of the UE or a channel change, the UE periodically measures the plurality of beams that are on the base station side and that are in an unconnected state. The UE determines the first beam pair based on the measurement results. Signal quality of a first beam connection formed by using the first beam pair is higher than that of a second beam connection, and the second beam connection may be a beam connection that has worst signal quality or largest power consumption in beam connections established between the UE and the base station.

The signal quality of the first beam connection formed by using the first beam pair is higher than that of the second beam connection established between the UE and the base station.

It may be understood that, the UE may also determine the first beam pair in another manner in step 1110 and step 1120. This is not limited again in this embodiment of the present invention.

Step 1130: The UE sends a first message to the base station, where the first message includes identification information of the UE and beam connection establishment request information.

Optionally, the UE sends the first message to the base station by using a first beam. The first beam is a beam in the first beam pair, and the first beam is a beam used by the UE.

The first message may be an RRC message or a MAC CE message, and the identification information of the UE may be a cell radio network temporary identifier (C-RNTI).

Optionally, when the first message is a MAC CE message, the MAC CE message includes a message subheader part and a payload part. The UE may reconfigure a value of a logical channel identifier (LCID) in a MAC CE subheader structure, to indicate beam connection establishment request information, beam connection establishment acknowledgement information, beam connection establishment rejection information, or the like; or the UE may reconfigure a payload structure of the MAC CE message, to indicate beam connection establishment request information, beam connection establishment acknowledgement information, beam connection establishment rejection information, or the like.

Figure 12:
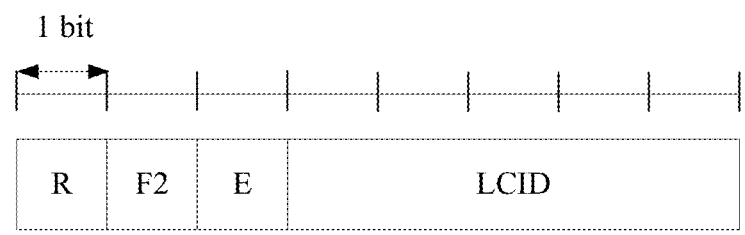
FIG. 12 is schematic structural diagram of a MAC CE subheader part according to an embodiment of the present invention.

As shown in FIG. 12, a structure of the MAC CE subheader part may include an R field of one reserved bit, a 1-bit F2 field, a 1-bit E field, and a 5-bit LCID field. F2 is a format field and is used to indicate a length of a length field. E is an extended field, and the extended field is a flag bit used to indicate whether another field exists in a MAC header. The UE may select an LCID value corresponding to each of index values 01011 to 11000, to indicate beam connection establishment request information, beam connection establishment acknowledgement information, beam connection establishment rejection information, or the like. A specific correspondence is stipulated in a protocol.

Figure 13:
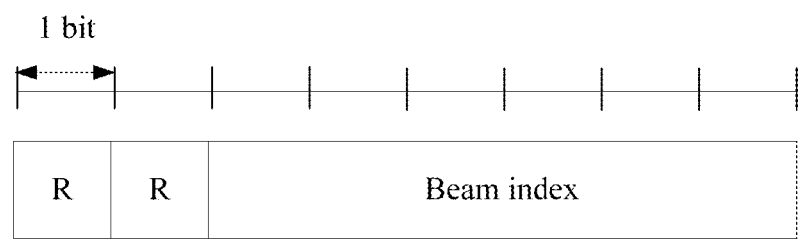
FIG. 13 is schematic structural diagram of a MAC CE payload part according to an embodiment of the present invention.

As shown in FIG. 13, a structure of the MAC CE payload part may include two reserved R bits and a newly added 6-bit beam index bit. The UE may increase or decrease a quantity of R bits, to indicate beam connection establishment request information, beam connection establishment acknowledgement information, beam connection establishment rejection information, or the like. The beam index bit indicates an index of a beam to be connected to. It should be noted that according to a communication requirement, the quantity of R bits in the MAC CE payload part may be any number ranging from 0 to 7. For example, if the quantity of R bits is 2 (that is, there are two R bits), the beam index bit is 6 bits.

The process shown in FIG. 12 and FIG. 13 may be used according to a design requirement, or another configuration process may be used according to a design requirement. This is not limited in the present invention.

Optionally, when the first message is an RRC message, the UE may add indication information to the RRC message. The indication information is used to indicate beam connection establishment request information, beam connection establishment acknowledgement information, beam connection establishment rejection information, or the like.

Optionally, the first message may further include index information of the to-be-replaced second beam connection, that is, the UE requests the base station to delete the established second beam connection.

Step 1140: After the base station determines, based on the identification information of the UE, that a quantity of beam connections between the base station and the UE reaches a connection threshold, the base station sends a first response message based on the beam connection establishment request information, where the first response message includes beam connection replacement indication information.

Optionally, the base station determines, by identifying a C-RNTI, the UE that requests a beam connection, and determines whether a current quantity of beam connections of the UE reaches the maximum connection threshold.

When the quantity of beam connections of the UE reaches the maximum connection threshold, the base station sends the first response message to the UE based on the beam connection establishment request information by using a first beam of the base station. The first response message may include the beam replacement indication information. The replacement indication information is used to instruct the UE to delete the established second beam connection, and establish a current beam connection, that is, the first beam connection formed by using the first beam pair.

When the quantity of beam connections of the UE reaches the maximum connection threshold, the base station sends the first response message to the UE by using an established beam connection other than the second beam connection. The first response message may include the beam replacement indication information and the index information of the to-be-replaced second beam connection or index information of a second beam, of the base station side, in the second beam connection.

Optionally, the base station sends the first response message to the UE by identifying the C-RNT, the beam establishment connection request information, and the index information of the to-be-replaced second beam connection. The first response message includes the beam replacement indication information.

Step 1150: The UE replaces, based on the beam connection replacement indication information, a second beam connection with a first beam connection formed by using the first beam pair.

Further, before step 1130, step 1151 is performed: The UE sends a random access preamble message to the base station by using a first beam.

Step 1152: The base station sends a random access response message to the UE based on the random access preamble message by using a first beam.

In the foregoing embodiment of the present invention, based on a multi-beam connection between the base station and the UE, the UE obtains the first beam, of the base station, that is not connected to. After the UE determines, from a plurality of first beams of the UE, a second beam that matches the first beam (that is, forms a beam pair), the UE sends, to the base station by using the second beam, the first message carrying the identification information of the UE and the beam establishment request information. When the base station determines, based on the identification information of the UE, that the quantity of beam connections between the base station and the UE reaches the connection threshold, the UE receives the first response message that is sent by the base station based on the beam establishment request information and that carries the beam replacement indication information. The UE replaces the second beam connection with the first beam connection based on the beam replacement indication information. The second beam connection is a beam connection established between the UE and the base station, and the first beam connection includes the second beam of the UE and the first beam of the base station. In this way, normal communication between the base station and the UE is improved.

Corresponding to the beam-based multi-connection communication methods in FIG. 7A and FIG. 7B, an embodiment of the present invention further provides a terminal.

A terminal may include a processing unit 1210, a receiving unit 1220, and a sending unit 1230.

The processing unit 1210 is configured to establish a communication connection to a first sub-beam of a network device (for example, a base station) by using a first beam in a plurality of beams.

The receiving unit 1220 is configured to receive, by using the first beam, downlink reference signals sent by a plurality of sub-beams of the base station.

The processing unit 1210 is further configured to: measure signal quality of the plurality of sub-beams of the base station based on the downlink reference signals, and determine a first beam pair based on measurement results, where the first beam pair includes the first beam of the terminal and the first sub-beam of the base station.

The sending unit 1230 is configured to send attribute information of the first sub-beam to the base station by using the first beam, so that the base station determines the first sub-beam based on the attribute information of the first sub-beam, and the base station establishes, by using the first sub-beam, a communication connection to the first beam used by the terminal.

Optionally, the sending unit 1230 is further configured to send attribute information of the plurality of sub-beams to the base station, so that the base station determines the first sub-beam based on the attribute information of the plurality of sub-beams, and the base station establishes, by using the first sub-beam, a communication connection to the first beam used by the terminal.

Optionally, before the processing unit 1210 establishes a communication connection to the first sub-beam of the base station by using the first beam, the sending unit 1230 is further configured to send an uplink reference signal to the base station by using the first beam, so that the base station determines a first beam pair based on the uplink reference signal, where the first beam pair includes the first beam of the terminal and the first sub-beam of the base station, so that the processing unit 1210 establishes a beam connection to the first sub-beam by using the first beam.

Optionally, the receiving unit 1220 is further configured to receive, by using the first beam, a first message sent by the base station, where the first message includes uplink reference signal resource information and first indication information, and the first indication information is used to indicate an uplink reference signal resource used by one or more beams of the terminal.

The sending unit 1230 is further configured to send the uplink reference signal to the base station based on the uplink reference signal resource information and the first indication information by using the plurality of beams.

Functions of the units of the terminal may be implemented by performing the steps in FIG. 7A and FIG. 7B. Therefore, a specific working process of the terminal provided in the foregoing embodiment of the present invention is not described herein again.

Corresponding to the beam-based multi-connection communication methods in FIG. 7A and FIG. 7B, an embodiment of the present invention further provides a base station.

A base station may include a processing unit 1310, a receiving unit 1320, and a sending unit 1330.

The processing unit 1310 is configured to establish a communication connection to a first beam of a terminal by using a first sub-beam, where the first sub-beam is a sub-beam of a first beam in a plurality of beams of the base station.

Before the processing unit 1310 establishes a communication connection to the first beam of the terminal by using the first sub-beam of the first beam, the sending unit 1330 is configured to send downlink reference signals to the terminal by using a plurality of sub-beams, so that the terminal measures signal quality of the plurality of sub-beams of the base station based on the downlink reference signals, and determines a first beam pair based on measurement results, where the first beam pair includes the first beam of the terminal and the first sub-beam of the first beam of the base station.

The receiving unit 1320 is configured to receive, by using the first beam, attribute information that is of the first sub-beam and that is sent by the terminal.

The processing unit 1310 determines the first sub-beam based on the attribute information of the first sub-beam. Alternatively, the receiving unit 1320 is further configured to receive, by using the first beam, attribute information of the plurality of sub-beams that is sent by the terminal.

The processing unit 1310 is further configured to: determine the first sub-beam based on the attribute information of the plurality of sub-beams, and establish a communication connection to the first beam of the terminal by using the first sub-beam.

Optionally, before the processing unit 1310 establishes a communication connection to the first beam of the terminal by using the first sub-beam, the receiving unit 1320 is further configured to receive, by using the first beam, an uplink reference signal sent by the terminal.

The processing unit 1310 is further configured to determine a first beam pair based on the uplink reference signal, so that the processing unit 1310 establishes a communication connection to the first beam of the terminal by using the first sub-beam, where the first beam pair includes the first beam of the terminal and the first sub-beam of the base station.

Optionally, the sending unit 1330 is further configured to send a first message to the terminal by using the first beam, where the first message includes uplink reference signal resource information and first indication information, and the first indication information is used to indicate an uplink reference signal resource used by one or more beams of the terminal.

The receiving unit 1320 is further configured to receive, by using the first beam, the uplink reference signal sent by the terminal based on the uplink reference signal resource information and the first indication information.

Optionally, before the sending unit 1330 sends the first message to the terminal by using the first beam, the processing unit 1310 is further configured to allocate at least one uplink reference signal resource to the terminal that has a multi-beam connection.

Functions of the units of the base station may be implemented by performing the steps in FIG. 8. Therefore, a specific working process of the base station provided in the foregoing embodiment of the present invention is not described herein again.

Corresponding to the beam-based multi-connection communication methods in FIG. 9 and FIG. 10, an embodiment of the present invention further provides a terminal.

Figure 14:
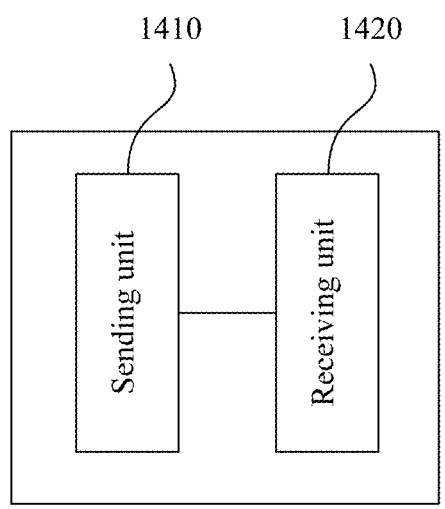
FIG. 14 shows another terminal according to an embodiment of the present invention.

FIG. 14 shows another terminal according to an embodiment of the present invention. As shown in FIG. 14, the terminal may include a sending unit 1410 and a receiving unit 1420.

The sending unit 1410 is configured to send a first message to a base station. After the base station determines, based on the first message, a to-be-deleted first beam connection from a beam connection connected between the base station and the terminal, the receiving unit 1420 is configured to receive a second message sent by the base station, where the second message includes information instructing to delete the first beam connection, to instruct to delete the first beam connection.

Optionally, the terminal may further include a processing unit 1430.

The first message is a measurement report, and the measurement report includes measurement results of signal quality of a plurality of beams of the base station.

When the base station determines, based on the measurement results, the to-be-deleted first beam connection from the beam connection connected between the base station and the terminal, the receiving unit 1420 receives the second message sent by the base station. The second message includes the information instructing to delete the first beam connection.

The processing unit 1430 is configured to delete the first beam connection based on the information instructing to delete the first beam connection, so that the receiving unit 1420 no longer listens to a downlink message sent by the base station by using the first beam connection.

Optionally, before the sending unit 1410 sends the first message to the base station, the receiving unit 1420 is further configured to receive, by using a plurality of beams, reference signals sent by the plurality of beams of the base station.

The processing unit 1430 is further configured to measure the signal quality of the plurality of beams of the base station based on the reference signals.

The sending unit 1410 is further configured to send the measurement report to the base station, where the measurement report includes the measurement results of the signal quality of the plurality of beams of the base station.

Optionally, the receiving unit 1420 is specifically configured to: receive, by using a first beam, the second message sent by the base station, where the first beam is a beam in a first beam pair in the first beam connection, and the first beam is a beam used by the terminal; or receive, by using a second beam other than a first beam of the terminal, the second message sent by the base station.

Optionally, the second message further includes index information of the to-be-deleted first beam connection.

When the receiving unit 1420 receives, by using the second beam other than the first beam of the terminal, the second message sent by the base station, the processing unit 1430 is specifically configured to delete the first beam connection based on the information instructing to delete the first beam connection and the index information of the to-be-deleted first beam connection.

Optionally, the first message is a delete request message, and the delete request message includes index information of the to-be-deleted first beam connection or index information of a first beam of the base station.

When the base station determines, based on the index information of the to-be-deleted first beam connection or the index information of the first beam of the base station, the to-be-deleted first beam connection from the beam connection connected between the base station and the terminal, the receiving unit receives the second message sent by the base station.

Functions of the units of the terminal may be implemented by performing the steps in FIG. 9 and FIG. 10. Therefore, a specific working process of the terminal provided in the foregoing embodiment of the present invention is not described herein again.

Corresponding to the beam-based multi-connection communication methods in FIG. 9 and FIG. 10, an embodiment of the present invention further provides a base station.

Figure 15:
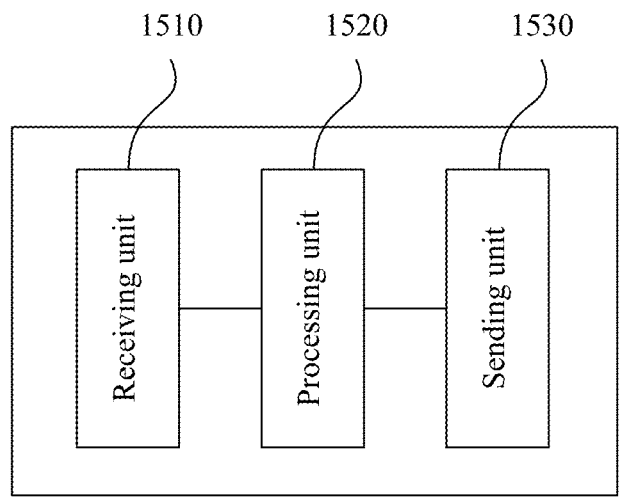
FIG. 15 shows another base station according to an embodiment of the present invention.

FIG. 15 shows another base station according to an embodiment of the present invention. As shown in FIG. 15, the base station may include a receiving unit 1510, a processing unit 1520, and a sending unit 1530.

The receiving unit 1510 is configured to receive, by using a plurality of beams, a first message sent by a terminal.

The processing unit 1520 is configured to determine, based on the first message, a to-be-deleted first beam connection from a beam connection connected between the base station and the terminal.

The sending unit 1530 is configured to send a second message to the terminal, where the second message includes information instructing to delete the first beam connection, to instruct to delete the first beam connection.

Optionally, the first message is a measurement report, and the measurement report includes measurement results of signal quality of the plurality of beams of the base station.

The processing unit 1520 is specifically configured to determine, based on the measurement results, the to-be-deleted first beam connection from the beam connection connected between the base station and the terminal.

Optionally, before the receiving unit 1510 receives the first message sent by the terminal, the sending unit 1530 is further configured to send reference signals to the terminal by using the plurality of beams, so that the terminal measures the signal quality of the plurality of beams of the base station based on the reference signals.

The receiving unit 1510 is further configured to receive, by using the plurality of beams, the measurement report sent by the terminal, where the measurement report includes the measurement results of the signal quality of the plurality of beams of the base station.

Optionally, the second message further includes index information of the to-be-deleted first beam connection, so that the terminal deletes the first beam connection based on the information instructing to delete the first beam connection and the index information of the to-be-deleted first beam connection, and the terminal no longer listens to a downlink message sent by the base station by using the first beam connection.

Optionally, the first message is a delete request message, and the delete request message includes index information of the to-be-deleted first beam connection or index information of a first beam of the base station.

The processing unit 1520 is specifically configured to determine, based on the index information of the to-be-deleted first beam connection or the index information of the first beam of the base station, the to-be-deleted first beam connection from the beam connection connected between the base station and the terminal.

Functions of the units of the base station may be implemented by performing the steps in FIG. 9 and FIG. 10. Therefore, a specific working process of the base station provided in the foregoing embodiment of the present invention is not described herein again.

Corresponding to the beam-based multi-connection communication method in FIG. 11, an embodiment of the present invention further provides a terminal.

Figure 16:
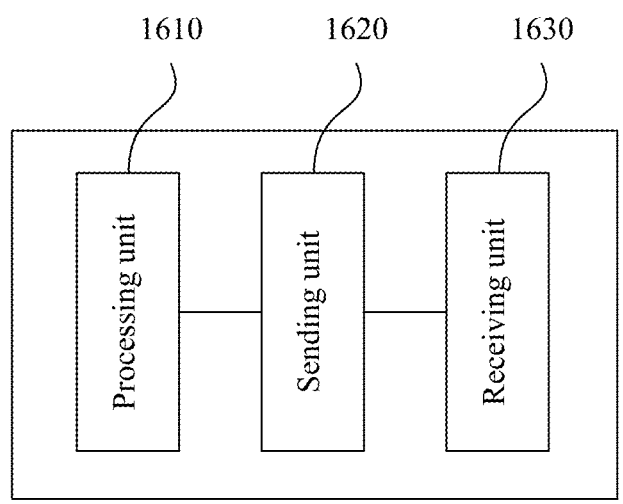
FIG. 16 shows still another terminal according to an embodiment of the present invention.

FIG. 16 shows still another terminal according to an embodiment of the present invention. As shown in FIG. 16, the terminal includes a processing unit 1610, a sending unit 1620, and a receiving unit 1630.

The processing unit 1610 is configured to determine a first beam pair.

The sending unit 1620 is configured to send a first message to a base station, where the first message includes identification information of the terminal and beam connection establishment request information.

When the base station determines, based on the identification information of the terminal, that a quantity of beam connections between the base station and the terminal reaches a connection threshold, the receiving unit 1630 is configured to receive a first response message sent by the base station based on the beam connection establishment request information, where the first response message includes beam connection replacement indication information.

The processing unit 1610 is further configured to replace, based on the beam connection replacement indication information, a second beam connection with a first beam connection formed by using the first beam pair, so that the receiving unit 1630 no longer listens to a downlink message sent by the base station by using the second beam connection, and instead, listens, by using the first beam connection, to the downlink message sent by the base station, where the second beam connection is a beam connection established between the terminal and the base station.

Optionally, the receiving unit 1630 is further configured to receive, by using each beam, a reference signal sent by the base station by using each of a plurality of beams.

The processing unit 1610 is further configured to: measure signal quality of the plurality of beams of the base station based on the reference signals, and determine the first beam pair based on measurement results, where signal quality of the first beam connection formed by using the first beam pair is higher than that of the second beam connection.

Optionally, the sending unit 1620 is specifically configured to send the first message to the base station by using a first beam, where the first beam is a beam in the first beam pair, and the first beam is a beam used by the terminal.

Optionally, the first response message further includes index information of the to-be-replaced second beam connection.

The processing unit 1610 is specifically configured to replace, based on the beam connection replacement indication information and the index information of the second beam connection, the second beam connection with the first beam connection formed by using the first beam pair.

Optionally, before the sending unit 1620 sends the first message to the base station, the sending unit 1620 is further configured to send a random access preamble message to the base station by using the first beam.

The receiving unit 1630 is further configured to receive, by using the first beam, a random access response message sent by the base station based on the random access preamble message.

Functions of the units of the terminal may be implemented by performing the steps in FIG. 11. Therefore, a specific working process of the terminal provided in the foregoing embodiment of the present invention is not described herein again.

Corresponding to the beam-based multi-connection communication method in FIG. 11, an embodiment of the present invention further provides a base station.

Figure 17:
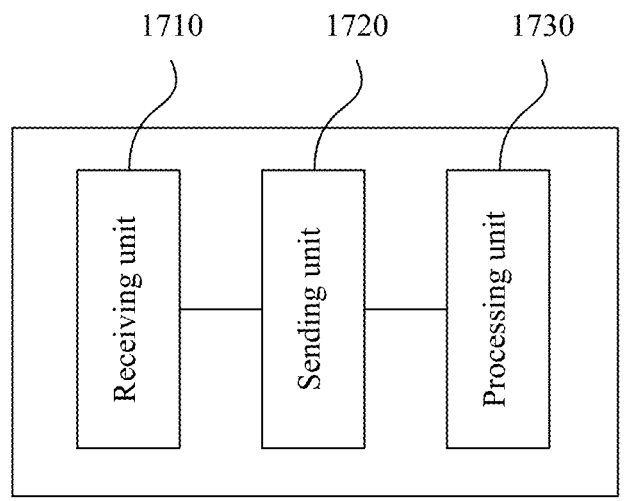
FIG. 17 shows still another base station according to an embodiment of the present invention.

FIG. 17 shows still another base station according to an embodiment of the present invention. As shown in FIG. 17, the base station includes a receiving unit 1710, a sending unit 1720, and a processing unit 1730.

The receiving unit 1710 is configured to receive a first message sent by the terminal after the terminal determines a first beam pair, where the first message includes identification information of the terminal and beam connection establishment request information.

After the processing unit 1730 determines, based on the identification information of the terminal, that a quantity of beam connections between the base station and the terminal reaches a connection threshold, the sending unit 1720 sends a first response message based on the beam connection establishment request information, where the first response message includes beam connection replacement indication information, so that the terminal replaces, based on the beam connection replacement indication information, a second beam connection with a first beam connection formed by using the first beam pair, and the terminal no longer listens to a downlink message sent by the sending unit by using the second beam connection, and instead, listens, by using the first beam connection, to the downlink message sent by the sending unit 1720, where the second beam connection is a beam connection established between the terminal and the base station.

Optionally, before the receiving unit 1710 receives the first message sent by the terminal after the terminal determines the first beam pair, the sending unit 1720 is further configured to send a reference signal to the terminal by using each of a plurality of beams, so that the terminal determines the first beam pair based on the reference signal, where signal quality of the first beam connection formed by using the first beam pair is higher than that of the second beam connection.

Optionally, the first response message further includes index information of the to-be-replaced second beam connection, so that the terminal replaces, based on the beam replacement indication information and the index information of the second beam connection, the second beam connection with the first beam connection formed by using the first beam pair.

Optionally, before the receiving unit 1710 receives the first message sent by the terminal, the receiving unit 1710 is further configured to receive, by using a first beam, a random access preamble message sent by the terminal.

The sending unit 1720 is further configured to send a random access response message to the terminal based on the random access preamble message by using the first beam.

Functions of the units of the base station may be implemented by performing the steps in FIG. 11. Therefore, a specific working process of the base station provided in the foregoing embodiment of the present invention is not described herein again.

Figure 18:
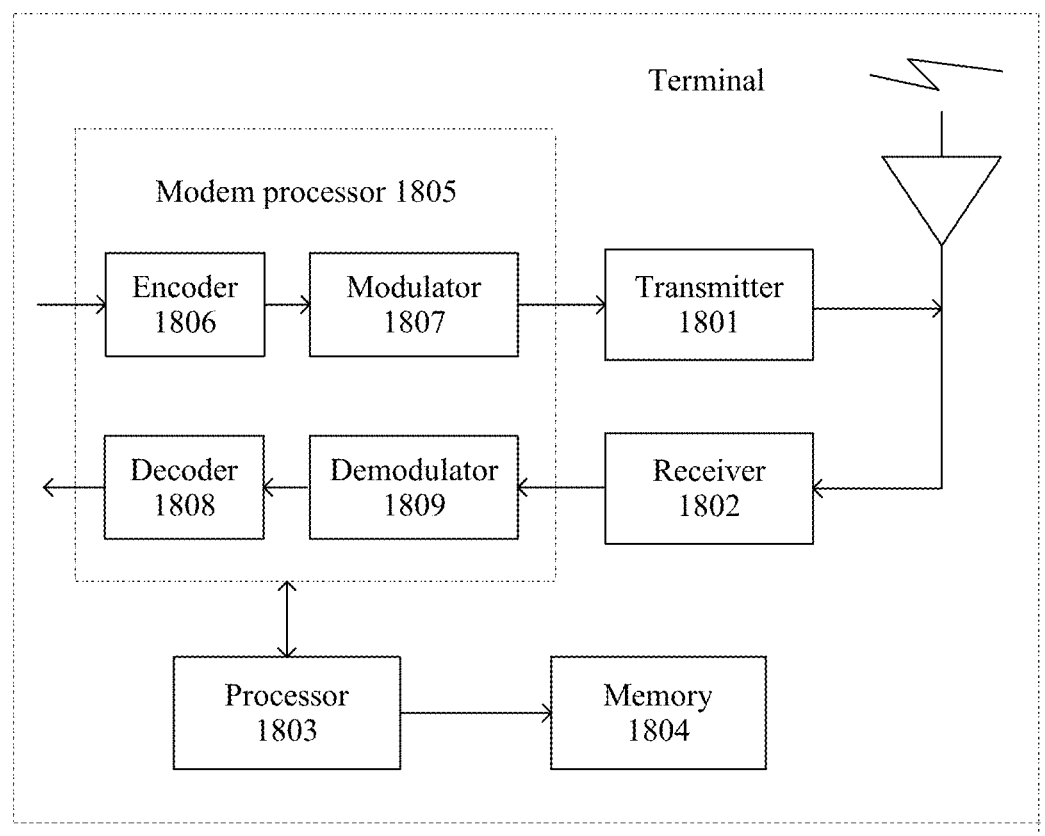
FIG. 18 shows still another terminal according to an embodiment of the present invention.

Corresponding to FIG. 12, FIG. 14, and FIG. 16, an embodiment of the present invention further provides still another terminal. As shown in FIG. 18, the terminal may include a transmitter 1801, a receiver 1802, a processor 1803, and a modem processor 1805.

The transmitter 1801 adjusts an output sample and generates an uplink signal. The uplink signal is transmitted to the base station in the foregoing embodiment by using an antenna. For example, the transmitter 1801 performs steps of communication between the terminal and the base station in FIG. 7A to FIG. 11. In a downlink, the antenna receives a downlink signal transmitted by the base station in the foregoing embodiment. The receiver 1802 adjusts the signal received from the antenna and provides an input sample, for example, performs the steps of communication between the terminal and the base station in FIG. 7A to FIG. 11. In the modem processor 1805, an encoder 1806 receives service data and a signaling message that are to be sent in an uplink, and processes (for example, formats, encodes, and interleaves) the service data and the signaling message. A modulator 1807 further processes (for example, performs symbol mapping on and modulates) encoded service data and an encoded signaling message, and provides an output sample. A demodulator 1809 processes (for example, demodulates) the input sample, and provides symbol estimation. A decoder 1808 processes (for example, de-interleaves and decodes) the symbol estimation, and provides decoded data and a decoded signaling message that are sent to the terminal. The encoder 1806, the modulator 1807, the demodulator 1809, and the decoder 1808 may be implemented by the composite modem processor 1805. These foregoing components perform processing based on a radio access technology (for example, access technologies in LTE, 5G, and other evolved systems) used by the base station.

The terminal may further include: a memory 1804, configured to store program code and data that are used for the terminal; and a processor 1803, configured to control and manage an action of the terminal, and perform processing performed by the terminal in the foregoing embodiment, for example, perform steps 720, 760, 920, 960, 1120, and 1150 in FIG. 7A, FIG. 7B, FIG. 9, and FIG. 11.

Figure 19:
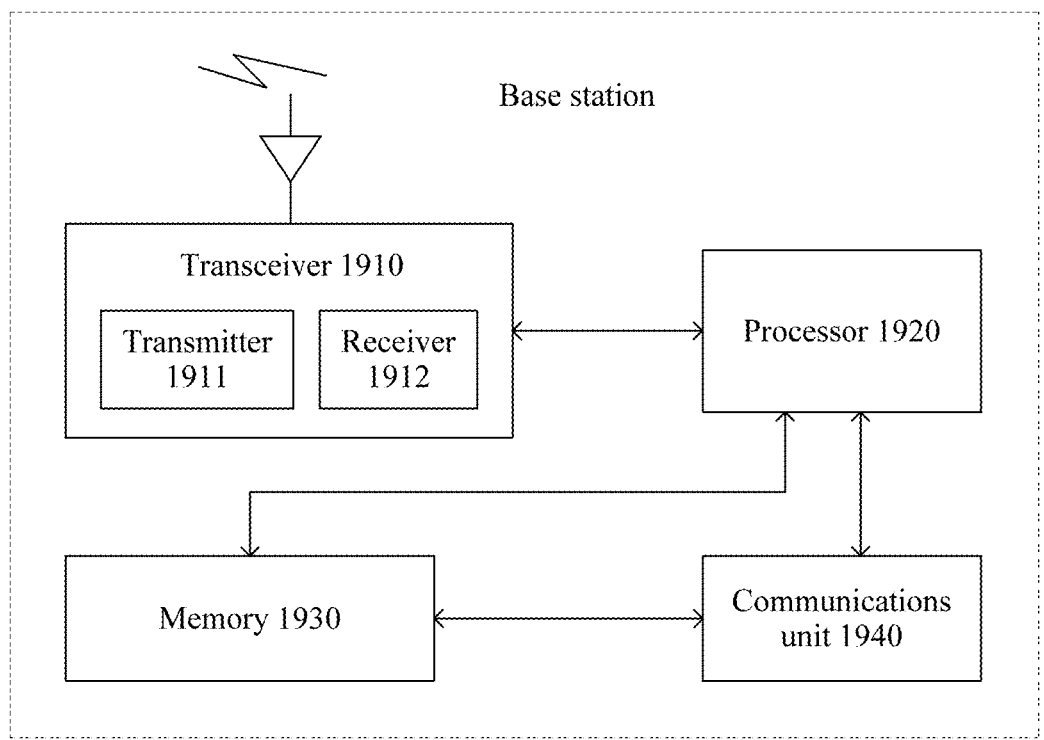
FIG. 19 shows still another base station according to an embodiment of the present invention.

Corresponding to FIG. 13, FIG. 15, and FIG. 17, an embodiment of the present invention further provides still another base station. As shown in FIG. 19, the base station may include a transceiver 1910 and a processor 1920.

The transceiver 1910 is configured to support information receiving and transmission between the base station and the terminal in the foregoing embodiment, and support wireless communication between the terminal and another terminal. The transceiver 1910 may include a transmitter 1911 and a receiver 1912. The processor 1920 performs various functions, in FIG. 7A to FIG. 10, used to communicate with the terminal. In an uplink, an uplink signal from the terminal is received by using an antenna, is demodulated by the transceiver 1910, and is further processed by the processor 1920 to restore service data and signaling information sent by the terminal. In a downlink, service data and a signaling message are processed by the processor 1920, such as step 940 in FIG. 9, and are demodulated by the transceiver 1910 to generate a downlink signal, and the downlink signal is transmitted to the terminal by using an antenna.

The base station may further include: a memory 1930, configured to store program code and data of the base station; and a communications unit 1940, configured to support communication between the base station and another network entity, for example, support communication between the base station and another communications network entity such as a core network.

It should be noted that the processor used to perform functions of the foregoing base station and terminal in the present invention may be a central processing unit (CPU), a general purpose processor, a digital signal processor (DSP), an application-specific integrated circuit (ASIC), a field programmable gate array (FPGA) or another programmable logic device, a transistor logic device, a hardware component, or any combination thereof. The processor may implement or execute various example logical blocks, modules, and circuits described with reference to content disclosed in the present invention. Alternatively, the processor may be a combination of processors implementing a computing function, for example, a combination of one or more microprocessors, or a combination of a DSP and a microprocessor.

The memory may be a volatile memory, for example, a random access memory (RAM); or may be a nonvolatile memory, for example, a read-only memory (ROM), a flash memory, a hard disk drive (HDD), or a solid-state drive (SSD); or may be a combination of the foregoing types of memories.

Steps of methods or algorithms described in the embodiments disclosed in this specification may be implemented by hardware, a software module executed by a processor, or a combination thereof. The software instruction may include a corresponding software module. The software module may be stored in a random access memory, a flash memory, a read-only memory, an erasable programmable read only memory (EPROM), an electrically erasable programmable read-only memory (EEPROM), a hard disk, a compact disc read-only memory (CD-ROM), or any other form of storage medium well-known in the art. As example storage medium is coupled to a processor, so that the processor can read information from the storage medium or write information into the storage medium. Certainly, the storage medium may be a component of the processor. The processor and the storage medium may be located in the ASIC. In addition, the ASIC may be located in user equipment. Certainly, the processor and the storage medium may exist in the user equipment as discrete components.

A person skilled in the art should be aware that in the foregoing one or more examples, functions described in the present invention can be implemented by hardware, software, firmware, or any combination thereof. When the present invention is implemented by software, the foregoing functions may be stored in a computer-readable medium or transmitted as one or more instructions or code in the computer-readable medium.

The objectives, technical solutions, and beneficial effects of the present invention are further described in detail in the foregoing specific implementations. It should be understood that the foregoing descriptions are merely specific implementations of the present invention, but are not intended to limit the protection scope of the present invention. Any modification, equivalent replacement, or improvement made based on the technical solutions of the present invention shall fall within the protection scope of the present invention.

What is claimed is:

1. A beam-based multi-connection communication method, comprising:

receiving, by a terminal device via a first beam of the terminal device and a plurality of sub-beams of a network device, downlink reference signals from the network device;

measuring, by the terminal device, signal quality of the plurality of sub-beams of the network device based on the downlink reference signals;

based on measuring the signal quality of the plurality of sub-beams of the network device, determining, by the terminal device, a first beam pair, wherein a first sub-beam of the network device and the first beam of the terminal device form the first beam pair;

sending, by the terminal device, attribute information of the first sub-beam of the network device to the network device via the first beam of the terminal device;

establishing, by the terminal device, a first connection to the first sub-beam of the network device via the first beam of the terminal device;

measuring, by the terminal device, a plurality of beams of the network device which are in an unconnected state to obtain measurement results; and based on the measurement results, replacing, by the terminal device, the first connection with a second connection to the network device via a second beam pair, wherein replacing the first connection with the second connection comprises deleting the first connection and adding the second connection, and wherein replacing the first connection with the second connection is further based on a quantity of beam connections of the terminal device having reached a maximum beam connection threshold.

2. The method according to claim 1, wherein before establishing the first connection, the method further comprises:

sending, by the terminal device, attribute information of the plurality of sub-beams to the network device via the first beam of the terminal device.

3. The method according to claim 1, wherein before establishing the first connection, the method further comprises:

sending, by the terminal device, an uplink reference signal to the network device via the first beam of the terminal device.

4. The method according to claim 3, wherein the method further comprises: receiving, by the terminal device via the first beam of the terminal device, a first message from the network device, wherein the first message comprises uplink reference signal resource information and first indication information, wherein the first indication information indicates an uplink reference signal resource used by one or more beams of the terminal device; and
    wherein sending the uplink reference signal to the network device is based on the uplink reference signal resource information and the first indication information.

5. The method according to claim 1, wherein measuring the plurality of beams of the network device is based on reference signals received by the terminal device via the plurality of beams of the network device.

6. The method according to claim 1, wherein measuring the plurality of beams of the network device is performed periodically.

7. The method according to claim 1, wherein after replacing the first connection with the second connection, the terminal device no longer listens for downlink messages from the network device on the first connection and instead listens for downlink messages from the network device on the second connection.

8. A beam-based multi-connection communication method, comprising:
    sending, by a network device, downlink reference signals to a terminal device via a plurality of sub-beams of the network device;
    receiving, by the network device via a first beam of the terminal device, attribute information of a first sub-beam of the network device from the terminal device; and
    determining, by the network device, the first sub-beam of the network device based on the attribute information of the first sub-beam;
    establishing, by the network device, a first connection to the first beam of the terminal device via the first sub-beam of the network device, wherein the first sub-beam of the network device and the first beam of the terminal device form a first beam pair;
    sending, by the network device, a reference signal to the terminal device via each of a plurality of beams of the network device;
    receiving, by the network device, a message from the terminal device, wherein the message includes identification information of the terminal device and beam connection establishment request information; and
    replacing, by the network device, the first connection with a second connection to the network device via a second beam pair, wherein replacing the first connection with the second connection comprises deleting the first connection and adding the second connection, and wherein replacing the first connection with the second connection is based on a quantity of beam connections of the terminal device having reached a maximum beam connection threshold.

9. The method according to claim 8, wherein before establishing the first connection, the method further comprises:
    receiving, by the network device via the first beam of the terminal device, an uplink reference signal from the terminal device; and
    determining, by the network device, the first beam pair based on the uplink reference signal.

10. The method according to claim 9, wherein the method further comprises: sending, by the network device, a first message to the terminal device via the first beam of the terminal device, wherein the first message comprises uplink reference signal resource information and first indication information, wherein the first indication information indicates an uplink reference signal resource used by one or more beams of the terminal device; and
    wherein receiving the uplink reference signal from the terminal device is based on the uplink reference signal resource information and the first indication information.

11. The method according to claim 10, wherein before sending the first message to the terminal device, the method further comprises:
    allocating, by the network device, at least one uplink reference signal resource to the terminal device that has a multi-beam connection.

12. The method according to claim 8, wherein before establishing the first connection, the method further comprises:
    receiving, by the network device via the first beam of the terminal device, attribute information of the plurality of sub-beams of the network device from the terminal device.

13. A terminal device, comprising a processor and a non-transitory memory having processor-executable instructions stored thereon, wherein the processor is configured to execute the processor-executable instructions to facilitate the following being performed by the terminal device:
    receiving, via a first beam of the terminal device and a plurality of sub-beams of a network device, downlink reference signals from the network device;
    measuring signal quality of the plurality of sub-beams of the network device based on the downlink reference signals;
    based on measuring the signal quality of the plurality of sub-beams of the network device, determining a first beam pair, wherein a first sub-beam of the network device and the first beam of the terminal device form the first beam pair;
    sending attribute information of the first sub-beam of the network device to the network device via the first beam of the terminal device;
    establishing a first connection to the first sub-beam of the network device via the first beam of the terminal device;
    measuring a plurality of beams of the network device which are in an unconnected state to obtain measurement results; and
    based on the measurement results, replacing the first connection with a second connection to the network device via a second beam pair, wherein replacing the first connection with the second connection comprises deleting the first connection and adding the second connection, and wherein replacing the first connection with the second connection is further based on a quantity of beam connections of the terminal device having reached a maximum beam connection threshold.

14. The terminal device according to claim 13, wherein the processor is further configured to execute the processor-executable instructions to facilitate the following being performed by the terminal device:

sending attribute information of the plurality of sub-beams to the network device.

15. The terminal device according to claim 13, wherein the processor is further configured to execute the processor-executable instructions to facilitate the following being performed by the terminal device:

before establishing the first connection, sending an uplink reference signal to the network device via the first beam.

16. The terminal device according to claim 15, wherein the processor is further configured to execute the processor-executable instructions to facilitate the following being performed by the terminal device: receiving, via the first beam, a first message from the network device, wherein the first message comprises uplink reference signal resource information and first indication information, wherein the first indication information indicates an uplink reference signal resource used by one or more beams of the terminal device; and wherein sending the uplink reference signal to the network device is based on the uplink reference signal resource information and the first indication information.

\* \* \* \* \*